United States Patent
Boosalis

(10) Patent No.: US 11,346,769 B2
(45) Date of Patent: May 31, 2022

(54) FAST GENERALIZED MULTI-WAVELENGTH ELLIPSOMETER

(71) Applicant: Onto Innovation Inc., Wilmington, MA (US)

(72) Inventor: Alexander George Boosalis, San Jose, CA (US)

(73) Assignee: Onto Innovation Inc., Wilmington, MA (US)

( * ) Notice: Subject to any disclaimer, the term of this patent is extended or adjusted under 35 U.S.C. 154(b) by 0 days.

(21) Appl. No.: 16/796,648

(22) Filed: Feb. 20, 2020

(65) Prior Publication Data
US 2021/0262921 A1    Aug. 26, 2021

(51) Int. Cl.
*G01N 21/21*    (2006.01)
*G01J 4/04*    (2006.01)

(52) U.S. Cl.
CPC .............. *G01N 21/211* (2013.01); *G01J 4/04* (2013.01)

(58) Field of Classification Search
CPC ................................ G01N 21/211; G01J 4/04
USPC .................................................. 356/367, 369
See application file for complete search history.

(56) References Cited

U.S. PATENT DOCUMENTS

| | | | | |
|---|---|---|---|---|
| 3,874,797 A | * | 4/1975 | Kasai | G01N 21/211 356/369 |
| 4,306,809 A | * | 12/1981 | Azzam | G01N 21/211 356/365 |
| 6,693,711 B1 | * | 2/2004 | Leger | G01J 4/00 356/364 |
| 6,927,888 B2 | * | 8/2005 | Garcia | G02B 5/3025 356/369 |
| 7,064,828 B1 | * | 6/2006 | Rovira | G01J 3/447 356/369 |
| 7,812,963 B2 | | 10/2010 | De Groot | |

(Continued)

FOREIGN PATENT DOCUMENTS

EP    2650661    10/2013
KR    10-0574776    4/2006
(Continued)

OTHER PUBLICATIONS

Hawley R. D. et al, Passive broadband full Stokes polarimeter using a Fresnel cone, Feb. 25, 2019, Scientific Reports 9, 2688 (2019). https://doi.org/10.1038/s41598-019-39118-0 (Year: 2019).*
(Continued)

*Primary Examiner* — Roy M Punnoose
(74) *Attorney, Agent, or Firm* — Paradice and Li LLP

(57) ABSTRACT

An ellipsometer uses a broadband light source and a Fresnel cone to produce a simultaneous broadband polarization state generator with no moving parts. The detector of the ellipsometer includes a diffractive element to spatially separate the wavelengths of the light from the sample. The wavelengths may be spatially separated sufficiently that there is no overlap of bands of wavelengths when imaged by a two-dimensional sensor or may be temporally separated. Additionally, the detector separates and simultaneously analyzes the polarizations states of the light from the sample so there is no overlap of polarization states when imaged by a two-dimensional sensor and no moving parts are used. The resulting image with separated wavelengths and polarization states may be used to determine at least a partial Mueller matrix for the sample.

40 Claims, 15 Drawing Sheets

(56) References Cited

U.S. PATENT DOCUMENTS

| | | | |
|---|---|---|---|
| 7,978,408 B2* | 7/2011 | Sawabe | G02B 5/001 |
| | | | 359/485.01 |
| 8,427,645 B2 | 4/2013 | Vagos | |
| 8,456,632 B2 | 6/2013 | Dainty | |
| 8,908,180 B2 | 12/2014 | Acher | |
| 9,389,349 B2 | 7/2016 | Kolchin | |
| 9,793,178 B2 | 10/2017 | Alonso | |
| 9,979,470 B2* | 5/2018 | Flettner | H04J 14/0227 |
| 10,921,255 B2 | 2/2021 | Sirat | |
| 10,955,331 B2 | 3/2021 | Piestun | |
| 11,067,450 B2 | 7/2021 | Shi | |
| 2004/0012853 A1* | 1/2004 | Garcia | G02B 21/008 |
| | | | 359/489.07 |
| 2006/0023987 A1* | 2/2006 | Yao | G01J 4/00 |
| | | | 385/11 |
| 2006/0164626 A1 | 7/2006 | Meeks et al. | |
| 2009/0040610 A1 | 2/2009 | Stallinga et al. | |
| 2011/0102793 A1* | 5/2011 | Straaijer | G01B 11/0641 |
| | | | 356/369 |
| 2011/0292402 A1 | 12/2011 | Awatsuji | |
| 2012/0069320 A1 | 3/2012 | Simonov et al. | |
| 2012/0140235 A1 | 6/2012 | Lee et al. | |
| 2012/0268812 A1 | 10/2012 | Anhut et al. | |
| 2015/0219497 A1* | 8/2015 | Johs | G01N 21/211 |
| | | | 356/367 |
| 2016/0313185 A1 | 10/2016 | Ma et al. | |
| 2018/0073862 A1 | 3/2018 | Sirat | |
| 2020/0025678 A1* | 1/2020 | Rapaport | G01N 21/274 |
| 2021/0349324 A1 | 11/2021 | Vuong | |

FOREIGN PATENT DOCUMENTS

| | | |
|---|---|---|
| KR | 10-2009-0051031 | 5/2009 |
| WO | WO 2009-118148 | 10/2009 |
| WO | WO 2019/147828 A1 | 8/2019 |
| WO | WO 2020/120942 | 6/2020 |

OTHER PUBLICATIONS

IP.com Search (Year: 2022).*

Radwell, N., "Achromatic vector vortex beams from a glass cone," Nature Communications, www.nature.com/naturecommunications, Feb. 10, 2016.

Peinado, A., "Conical refraction as a tool for polarization metrology," Optics Letters, vol. 38, No. 20, Oct. 15, 2013.

Azzam, R., "Instrument matrix of the four-detector photopolarimeter: physical meaning of its rows and columns and constraints on its elements," University of New Orleans, ScholarWorks@UNO, Jan. 1, 1990.

Hawley, R., "Passive broadband full Stokes polarimeter using a Fresnel cone," https://www.researchgate.net/publication/327134557, Aug. 16, 2018.

Hawley, R., "Passive broadband full Stokes polarimeter using a Fresnel cone," Scientific Reports, www.nature.com/scientificreports, Feb. 25, 2019.

Rubin, N., "Polarization state generation and measurement with a single metasurface," Optics Express 21455, vol. 26, No. 17, Aug. 20, 2018.

Sparks, W., "Classical polarimetry with a twist: a compact, geometric approach," SETI Institute.

Dyankov, G., "Vortex polarimetry," In Proceedings of SPIE—The International Society for Optical Engineering, Sep. 2008.

Morales, G., "Spatially resolved polarimetry using conventional and unconventional polarization states," Centro de Investigaciones en Optica, A.C., Feb. 23, 2017.

Chang, J., "Single-shot spatially modulated Stokes polarimeter based on a GRIN lens," Optics Letters, vol. 39, No. 9, May 1, 2014.

Wang, X., "Full vector measurements of converging terahertz beams with linear, circular, and cylindrical vortex polarization," Optics Express, vol. 22, No. 20, Oct. 6, 2014.

International Search Report and Written Opinion dated May 13, 2021 from PCT/US2021/014431, filed Jan. 21, 2021.

U.S. Appl. No. 16/264,710, filed Feb. 1, 2019.

Non-Final Office Action dated Jun. 22, 2020, in U.S. Appl. No. 16/264,710, filed Feb. 1, 2019.

Final Office Action dated Nov. 4, 2020, in U.S. Appl. No. 16/264,710, filed Feb. 1, 2019.

Restriction dated Mar. 23, 2021, in U.S. Appl. No. 16/264,710, filed Feb. 1, 2019.

Revised Restriction dated May 17, 2021, in U.S. Appl. No. 16/264,710, filed Feb. 1, 2019.

Non-Final Office Action dated Aug. 24, 2021, in U.S. Appl. No. 16/264,710, filed Feb. 1, 2019.

U.S. Appl. No. 17/110,214, filed Dec. 2, 2020.

Notice of Allowance dated Dec. 29, 2021, in U.S. Appl. No. 17/110,214, filed Dec. 2, 2020.

International Search Report and Written Opinion dated Feb. 8, 2022, in PCT Application No. PCT/US2021/055961, filed Oct. 21, 2021.

* cited by examiner

FAST GENERALIZED MULTI-WAVELENGTH ELLIPSOMETER

BACKGROUND

Ellipsometers are optical metrology devices that detect changes in the polarization state of light reflected from a surface of a sample in order to measure characteristics of the sample. A conventional spectroscopic ellipsometer includes a broad band light source, a polarization state generator, a polarization state analyzer and a detector. A spectroscopic ellipsometer may be used to produce a generalized (e.g., full Mueller matrix) ellipsometry measurement over multiple wavelengths. Typically, rotating optics, e.g., one or more of a rotating polarizer, analyzer, or compensator, are used in generate the ellipsometric measurements. Generating measurements using rotating optics, however, is relatively slow.

One design that eliminates the need for rotating optics is a four-detector polarimeter, in which four separate polarization state detectors (PSD) are used in conjunction with beam splitters or modulation techniques. The use of four separate PSDs eliminate the need for rotating optics on the detection side of the ellipsometer and allows simultaneous measurement of the entire polarization state of the beam after reflection from the sample. The four-detector polarimeter, however, suffers from several drawbacks. For example, the initial polarization state is either 45° linearly polarized light, which limits the final measurement to 12 of the 16 Mueller elements, or is modulated in time through several input polarizations, which increase the measurement time and require rotating optical elements. Moreover, the instrument is designed as either a single wavelength ellipsometer, or requires the use of 4 different spectrometers, one for each PSD, requiring sophisticated calibration and computer control to operate. Further, the tool uses 4 separate beam paths, one for each PSD, making the tool difficult to calibrate, difficult to align, and expensive.

An improved ellipsometer is desirable that decreases the time required to complete a generalized (full Mueller matrix) ellipsometry measurement for multiple wavelengths.

SUMMARY

An ellipsometer uses a broadband light source and a Fresnel cone to produce a simultaneous broadband polarization state generator with no moving parts. The detector of the ellipsometer includes a diffractive element to spatially separate the wavelengths of the light from the sample. The wavelengths may be spatially separated sufficiently that there is no overlap of bands of wavelengths when imaged by a two-dimensional sensor or may be temporally separated. Additionally, the detector separates and simultaneously analyzes the polarizations states of the light from the sample so there is no overlap of polarization states when imaged by a two-dimensional sensor and no moving parts are used. The resulting image with separated wavelengths and polarization states may be used to determine at least a partial Mueller matrix for the sample.

In one implementation, an ellipsometer includes a light source that emits light having multiple wavelengths; a polarizer that polarizes the light to produce polarized light; a Fresnel cone that receives the polarized light and produces sample light having a plurality of polarization states at each of the multiple wavelengths; a lens system that causes the sample light to be incident on a sample and to receive reflected light from the sample; a detector that receives the reflected light, the detector comprising: at least one diffractive element that separates the wavelengths in the reflected light; a polarization separator that receives the reflected light and separates the reflected light into a plurality of polarization states; a two-dimensional sensor that receives an image of spatially separated wavelengths at each of the plurality of polarization states of the reflected light; and a processor that receives the image from the two-dimensional sensor and determines at least a partial Mueller matrix for the sample using the image of the spatially separated wavelengths at each of the plurality of polarization states of the reflected light.

In one implementation, a method of characterizing a sample with an ellipsometer includes generating light having multiple wavelengths; polarizing the light; modifying the polarized light to produce sample light having a plurality of polarization states at each of the multiple wavelengths using a Fresnel cone; causing the sample light to be incident on the sample, wherein the sample light interacts with and is reflected by the sample producing reflected light; separating the wavelengths in the reflected light using at least one diffractive element; separating the reflected light into a plurality of polarization states using a polarization separator; imaging spatially separated wavelengths at each of the plurality of polarization states of the reflected light using a two-dimensional sensor; and determining at least a partial Mueller matrix for the sample using the image of the spatially separated wavelengths at each of the plurality of polarization states of the reflected light.

In one implementation, an ellipsometer includes means for generating light having multiple wavelengths; means for polarizing the light; means for modifying the polarized light to produce sample light having a plurality of polarization states at each of the multiple wavelengths; means for causing the sample light to be incident on the sample, wherein the sample light interacts with and is reflected by the sample producing reflected light; means for separating the wavelengths in the reflected light; means for separating the reflected light into a plurality of polarization states; means for capturing one or more images of separated wavelengths at each of the plurality of polarization states of the reflected light; and means for determining at least a partial Mueller matrix for the sample using the one or more images of the separated wavelengths at each of the plurality of polarization states of the reflected light.

DETAILED DESCRIPTION

A spectroscopic ellipsometer is capable of measuring the full Mueller matrix of a sample across multiple wavelengths using no moving parts and a single beam path, or a limited number of beam paths. An ellipsometer capable of measuring the full Mueller matrix is sometimes referred to as a "generalized" ellipsometer, while a "standard" ellipsometer may only measure 6 of the 16 Mueller elements. The elimination of moving parts enhanced measurement speed, relative to a conventional ellipsometer, and the use of a single beam path (or limited number of beam paths) improves accuracy and ease of use relative to, e.g., a four-detector polarimeter or similar devices.

The ellipsometer uses a broadband light source and a Fresnel cone to produce a simultaneous broadband polarization state generator with no moving parts. The Fresnel cone may use a high-index optical coating to keep the induced phase constant for a broad range of wavelengths of interest. With the Fresnel cone, each wavelength contains a large solid angle of the Poincare sphere within the pupil plane of the beam. The Fresnel cone creates diverse polarization structures for a plurality of wavelengths of the light using total internal reflection, and functions as a complete simultaneous broadband polarization state generator.

The detector of the ellipsometer includes one or more diffractive elements that separate the wavelengths of the light reflected from a sample. For example, if the light source produces a non-continuous spectrum, e.g., a frequency comb, the diffractive elements may spatially separate the bands of wavelengths so that there is no overlap when imaged by a two-dimensional sensor. If the light source produces a continuous spectrum, wavelength filter or filters may be employed along with the diffractive elements to spatially separate the bands of wavelengths so that there is no overlap when imaged by a two-dimensional sensor.

Additionally, the detector separates and simultaneously analyzes a number of polarization states of the light reflected from a sample without moving parts. For example, a polarization separator in the form a meta-grating may be used. The meta-grating diffracts the light reflected from the sample into separate orders based on polarization state. Alternatively, a beam splitter and Fresnel cone may be used to produce a number of different polarization states. An analyzer, e.g., in the form of a stationary polarizer or a micropolarizer array is used to simultaneously analyze the light with separated polarization states, which do not overlap on the two-dimensional sensor. The resulting image with separated wavelengths and polarization states may be used to determine at least a partial Mueller matrix for the sample.

Figure 1:
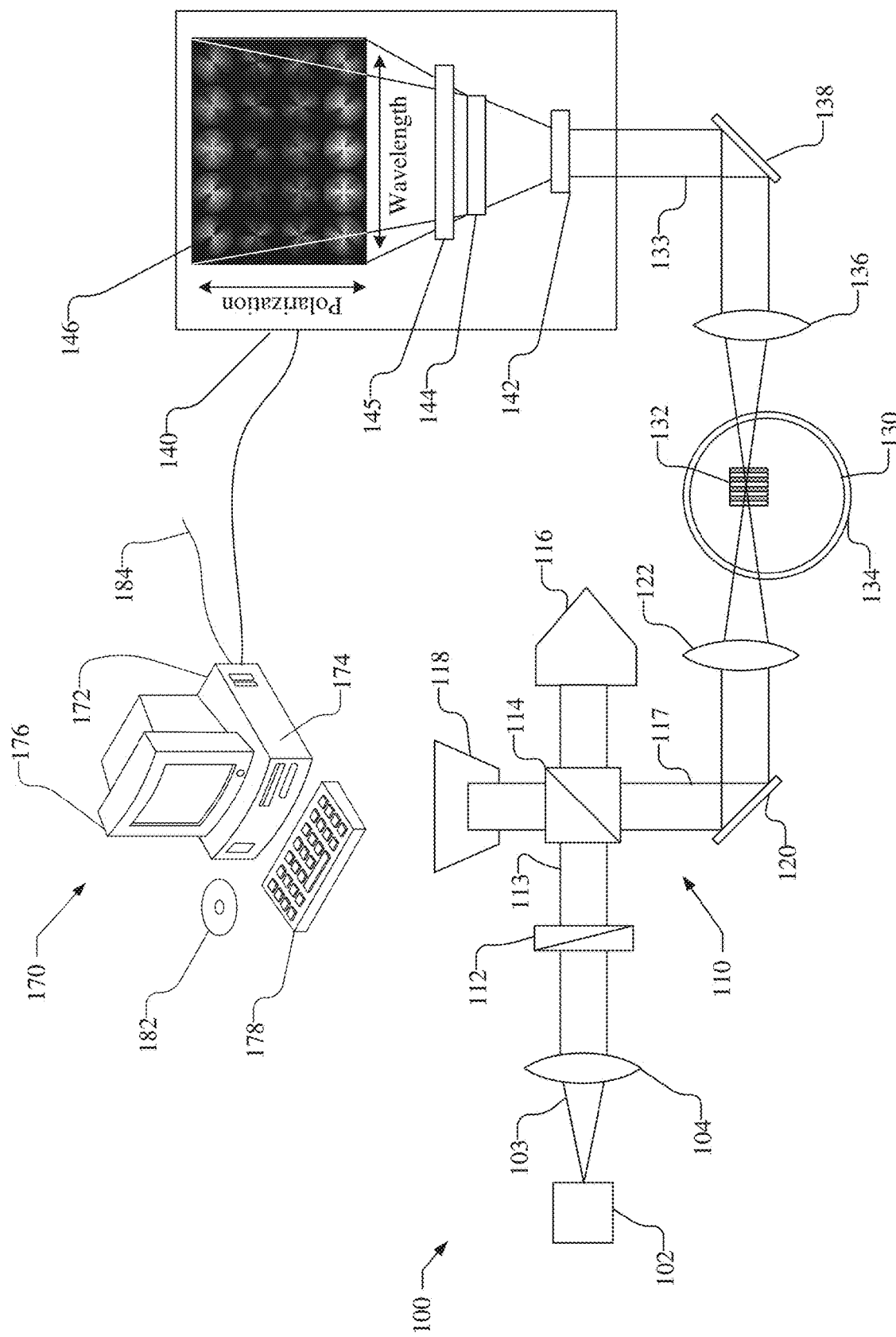
FIG. 1 illustrates an ellipsometer configured to measure at least a partial Mueller matrix of a sample across multiple wavelengths using no moving parts.

FIG. 1 illustrates an ellipsometer 100 configured to measure at least a partial Mueller matrix of a sample across multiple wavelengths using no moving parts. As illustrated, ellipsometer 100 includes a light source 102, a polarization state generator (PSG) 110, a polarization state analyzer (PSA) 145, and a two-dimensional sensor 146. The light source 102 is a broadband light source that emits multiple wavelengths, e.g., in one or more wavelength bands. In some implementations, the light source 102 may produce multiple non-contiguous bands of wavelengths. In some implementations, the light source 102 may produce the multiple bands of wavelengths simultaneously, while in other implementations, the light source 102 may produce each of the multiple bands of wavelengths separately, e.g., within a short period of time. For example, the light source 102 may be a broadband frequency comb light source or a Fourier domain mode locked laser light source. In some implementations, the light source 102 may produce multiple contiguous wavelengths, e.g., in a single wideband of wavelengths. For example, the light source 102 may be, a thermal (halogen) bulbs or high pressure arc-discharge plasma lamps. One or more optical components 104 may be used to collimate the light 103 produced by the light source 102.

The polarization state generator 110 includes a polarizer 112, e.g., a linear polarizer, a beam splitter 114, and a Fresnel cone 116. The polarizer 112 receives the collimated light and produces linearly polarized light 113. The beam splitter 114 receives and directs the polarized light 113 towards the Fresnel cone 116. The Fresnel cone 116 is an optical prism that introduces a desired phase difference between two perpendicular components of polarization using two total internal reflections (TIR). The Fresnel cone 116 creates a plurality of polarizations states at each wavelength of the light 113 using total internal reflection (TIR).

Figure 2A:
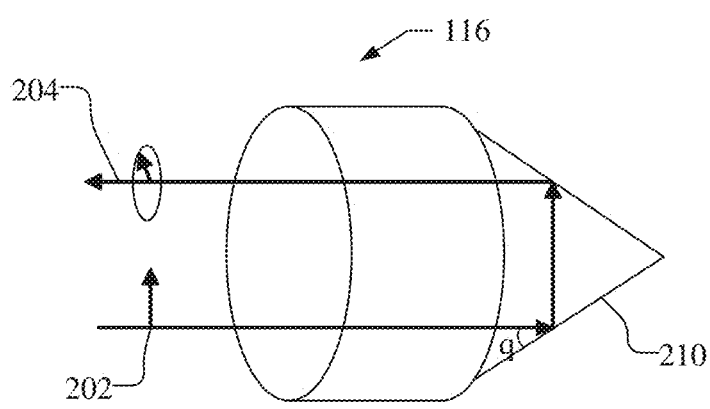
FIGS. 2A and 2B illustrates a perspective view and a side view of a Fresnel cone.
Figure 2B:
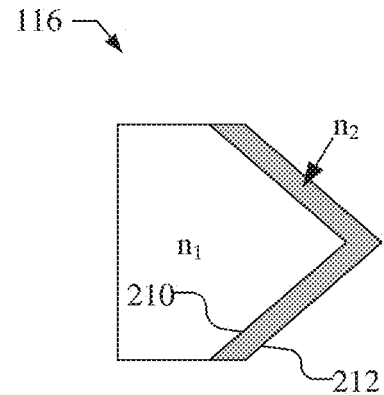

FIG. 2A illustrates a side perspective view of Fresnel cone 116 receiving input light 202, e.g., from polarizer 112 in FIG. 1, that is linearly polarized. The resulting polarization of the output light 204 from the Fresnel cone 116 is dependent upon the initial polarization of input light 202, the refractive index of the cone material at the wavelength of the light, and the incident angle θ upon striking the back 210 of the Fresnel cone 116. FIG. 2B illustrates a side view of Fresnel cone 116, showing the cone material having a first refractive index $n_1$, and a coating material 212 on the back 210 of the Fresnel cone having a second refractive index $n_2$.

Figure 3:
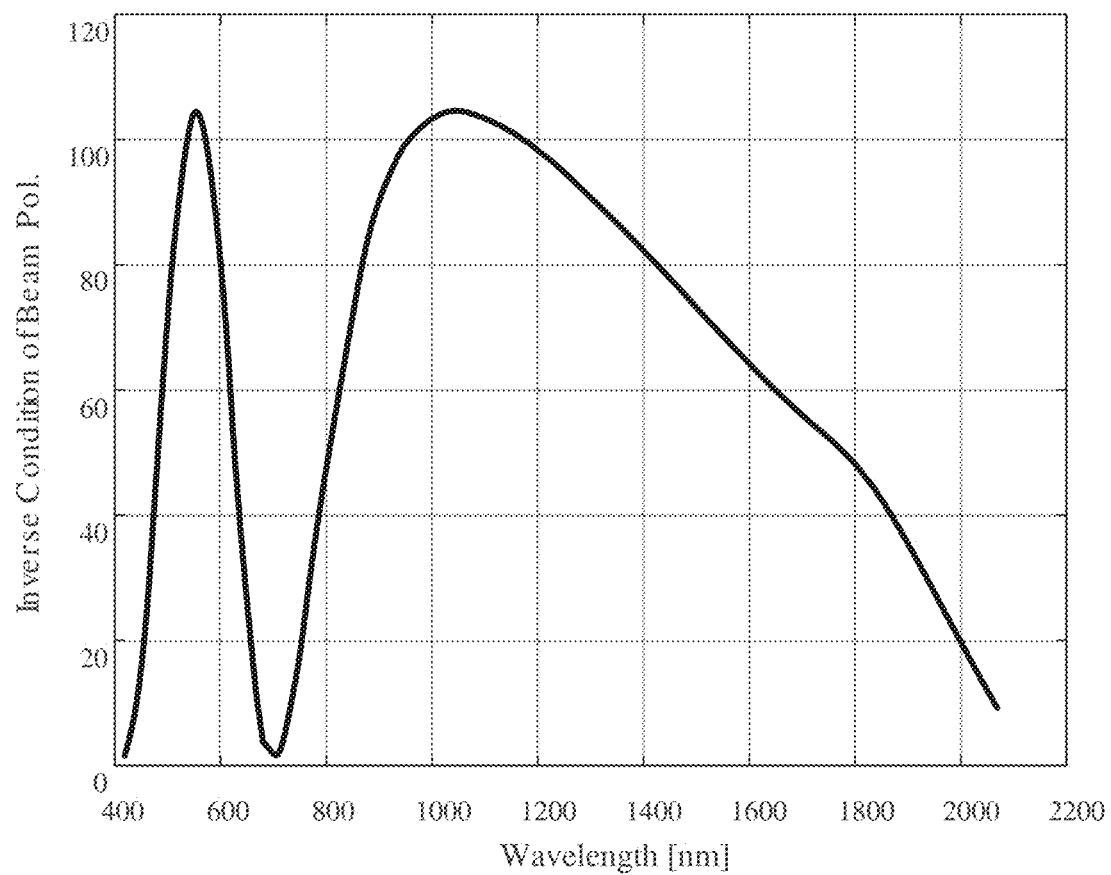
FIG. 3 is a graph illustrating the inverse condition number of the combined Stokes vectors from each pixel of a simulated beam output by an unmodified Fresnel cone for a given wavelength.
Figures 4A, 4B, 4C, 4D:
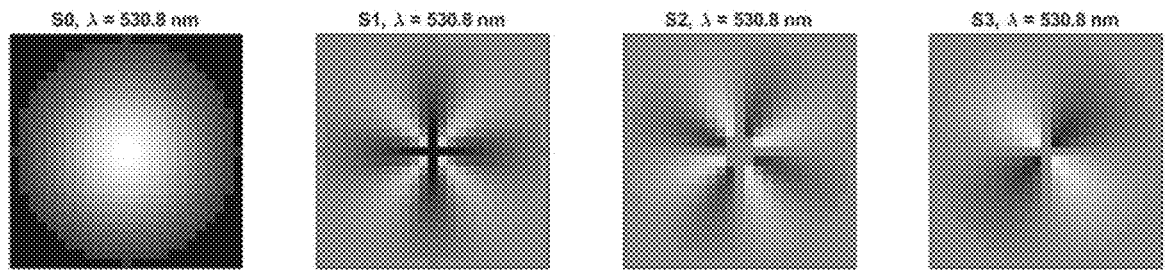
FIGS. 4A, 4B, 4C, and 4D illustrate simulated pupil maps for a Fresnel cone for each Stokes component at one wavelength.
Figures 5A, 5B, 5C, 5D:
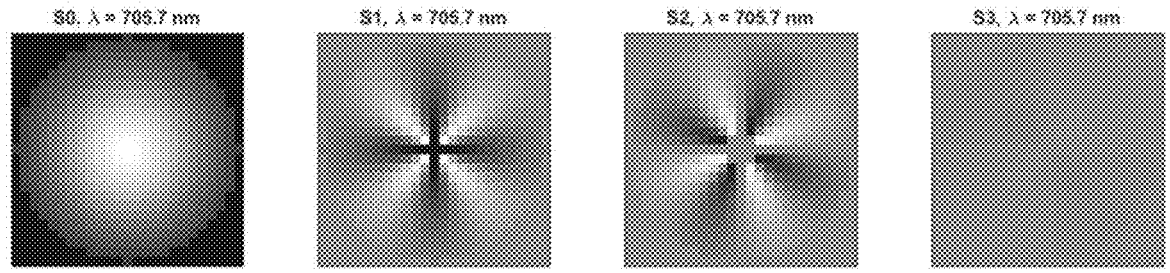
FIGS. 5A, 5B, 5C, and 5D illustrate simulated pupil map for a Fresnel cone for each Stokes component at a wavelength different than that used to generate FIGS. 4A, 4B, 4C, and 4D.

Not every wavelength may experience the same phase shift through a Fresnel cone. FIG. 3, for example, illustrates the inverse condition number of the combined Stokes vectors from each pixel of a simulated beam output by an unmodified $ZrO_2$ Fresnel cone 116 for a given wavelength. The inverse condition number of the combined Stokes vectors serves as a predictor of the quality of any resulting ellipsometry data. At some wavelengths, the output beam consists of only one polarization, for example, at ~705 nm, and the inverse condition number is then near 0, as illustrated. At other wavelengths the beam has a diverse polarization structure, for example, at ~530 nm, that will result in a high quality ellipsometry measurement. FIGS. 4A, 4B, 4C, and 4D, by way of example, illustrate simulated pupil maps for a Fresnel cone for each Stokes component, S0, S1, S2, and S3, respectively, at wavelength 530.8 nm, while FIGS. 5A, 5B, 5C, and 5D similarly illustrate simulated pupil map for the Fresnel cone for each Stokes component, S0, S1, S2, and S3, respectively, at wavelength 705.7 nm. As can be seen in FIGS. 4B-4D, the pupil maps at wavelength 530.8 nm illustrate a more diverse polarization structure than illustrated in the corresponding pupil maps at wavelength 705.7 nm shown in FIGS. 5B-5D, e.g., FIG. 5D shows that at 705.7 nm, there is no polarization information for S3, while in FIG. 4D at 530.8 nm both positive and negative polarization information is provided for S3.

Figure 6:
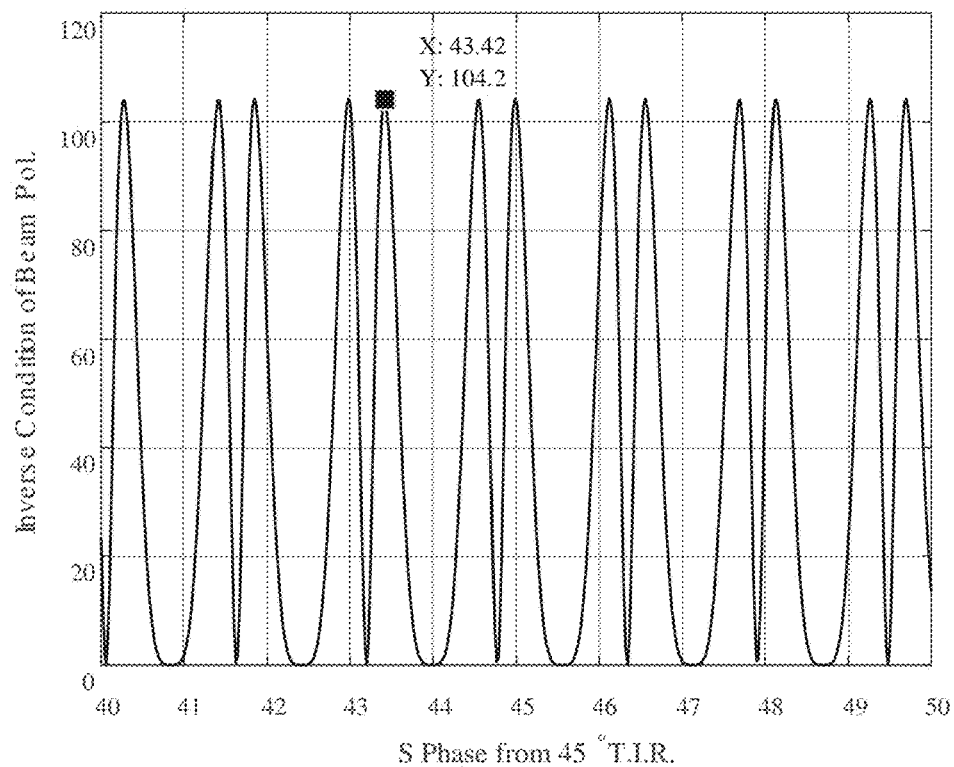
FIG. 6 is a graph illustrating the inverse condition of a polarized beam a phase shift resulting from a 45° TIR in a Fresnel cone.

As the ratio of the refractive index of the Fresnel cone 116 to the exterior changes, so does the phase shift induced by TIR. Certain phase shifts result in diverse polarization structure and will provide good ellipsometry measurements, while other phase shifts produce only one polarization state and are not useful. FIG. 6, for example, is a graph illustrating the inverse condition of a polarized beam on the Y axis, and a variety of phase shifts resulting from a 45° TIR in a Fresnel cone 116.

The coating material 212 on the outside of the Fresnel cone 116, as illustrated in FIG. 2B, enables control of the phase shift at each desired wavelength to produce a diverse polarization structure. In other words, the coating material 212 may be selected to produce a constant phase shift across desired wavelengths. The following expressions govern the requirements for the coating material 212.

$$\frac{2}{\sqrt{2}} < \frac{n_2}{n_1} = \sqrt{\frac{-2}{\tan\left(\frac{d_s}{2}\right)^2 - 1}} \qquad \text{eq. 1}$$

Figure 7:
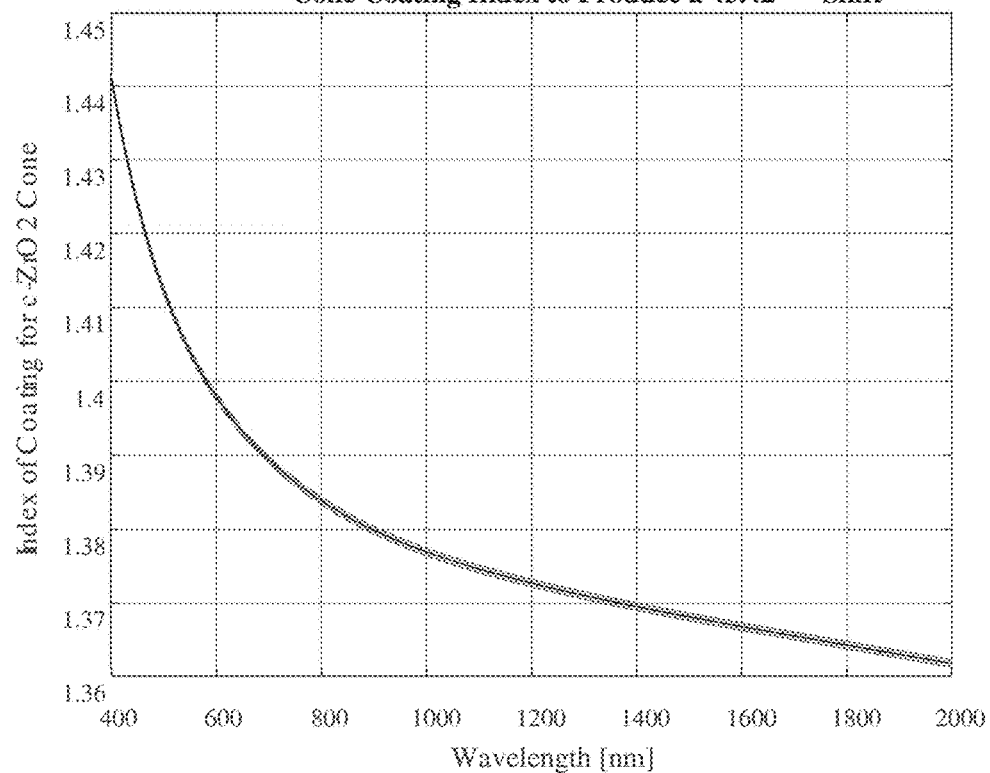
FIG. 7 is a graph illustrating a refractive index with respect to wavelength for a coating material on Fresnel cone to produce a constant phase shift for different wavelengths.

In equation 1, $d_s$ represents the phase shift introduced between p- and s-polarized light, which is referenced as an s-shift compared to p, and thus uses the subscript "s." FIG. 6 shows that a variety of phase shifts result in an acceptable polarization diversity, and thus, $d_s$ may be chosen based on what is convenient for other parts of the system. FIG. 7 is a graph illustrating a refractive index with respect to wavelength for a coating material 212 on the $ZrO_2$ Fresnel cone 116 to produce a constant $d_s$ of 43.42° phase shift for the wavelengths.

Referring to FIG. 1, the Fresnel cone 116 receives polarized light 113 from the polarizer 112 via the beam splitter 114, which is a non-polarizing beam splitter. FIG. 1 illustrates beam splitter 114 transmitting light towards the Fresnel cone 116, but if desired beam splitter 114 may reflect light towards the Fresnel cone 116. As discussed above, the Fresnel cone 116 creates diverse polarization structures for a plurality of wavelengths of the light using TIR. With proper selection and design of the coating material 212, shown in FIG. 2B, a constant phase shift may be produced across desired wavelengths by the Fresnel cone 116, producing light from the Fresnel cone 116 with diverse polarization structures for the desired wavelengths. The beam splitter 114 receives the light from the Fresnel cone 116 and directs the light 117 towards a sample 130.

Optionally, as illustrated, the beam splitter 114 may direct a portion of the polarized light 113 received from polarizer 112 to an intensity monitor 118, which may be used to monitor input light for fluctuations for normalization of measurements.

FIG. 1 illustrates the light 117 from Fresnel cone 116 (via beam splitter 114) being directed towards the sample 130 by folding mirror 120, but other arrangements of optical elements may be used. Focusing optics 122 focuses the light 117 on a structure 132 on a sample 130 that is held on a stage 134. FIG. 1 illustrates focusing optics 122 with a single refractive lens, but multiple optical elements/lenses, either refractive or reflective, or a combination thereof, may be used. The stage 134 may be capable of motion to produce relative motion between the sample 130 and the optical system of the ellipsometer 100 so that the sample 130 may be placed at a plurality of positions for measurements of different locations on the sample 130. For example, the stage 134 may move the sample 130 linearly, e.g., within the Cartesian coordinate plane (X,Y) directions, or may rotate and linearly move the sample 130, e.g., in Polar coordinate plane (R, θ). If desired, the stage 134, one or more optical elements of the ellipsometer 100, or both may both be moved, e.g., the stage 134 may rotate while more optical elements of the ellipsometer 100 move linearly. The stage 134 or optical elements of the ellipsometer 100 may further be capable of vertical motion, e.g., for focusing.

The structure 132 on the sample 130 will alter the polarization state of the light 117 and the reflected light 133 from the sample 130 is received by focusing optics 136, which may match focusing optics 122. Focusing optics 136, for example, may include multiple optical elements/lenses, either refractive or reflective, or a combination thereof. The light 133 is directed to a detector 140 that includes a polarization state analyzer (PSA) 145, e.g., with folding mirror 138, but other arrangements of optical elements may be used.

The detector 140 includes a wavelength separator 142, a polarization separator 144, a PSA 145 and a two-dimensional sensor 146. The wavelength separator 142 may spatially separate the wavelengths in the reflected light 133, e.g., where multiple wavelengths are produced by light source 102 simultaneously. For example, the wavelength separator 142 may be a diffractive element that spatially separates the multiple wavelengths in the reflected light 133, and thus, wavelength separator 142 may be sometimes referred to herein as a wavelength diffractive element 142. In implementations where wavelength separator 142 spatially separates the wavelengths in the reflected light 133, the two-dimensional sensor 146 may be used to simultaneously capture both wavelength and polarization information along separate axes. In another example, the wavelength separator 142 may temporally separate the multiple wavelengths in the reflected light 133, e.g., where multiple wavelengths are produced by light source 102 simultaneously or sequentially.

For example, the wavelength separator 142 may be an acousto-optic tunable filter that separates wavelengths in the reflected light 133 (using diffraction in this instance) into narrow bands of wavelengths and quickly switches between each band, e.g., minimum switching time is 200 ns, to capture each band of wavelength over time. The wavelength separator 142 may temporally separate wavelengths in other manners. For example, other types of tunable filters, similar to acousto-optic tunable filters may be used. In another implementation, the light source 102 may produce multiple wavelengths sequentially, and separate wavelengths may be collected using a high-speed camera as the sensor 146, which collects multiple frames, each frame representing a wavelength. In this implementation, the wavelength separator 142 may be considered to be the light source 102 and the high speed sensor 146, and thus, the illustration of wavelength separator 142 shown in FIG. 1 may be considered functional as opposed to physical. In implementations where wavelength separator 142 temporally separates the wavelengths in the reflected light 133, the two-dimensional sensor 146 may capture multiple frames, where each frame captures polarization information for a different wavelength.

The polarization separator 144 receives the reflected light 133 and separates the reflected light into a plurality of polarization states. The PSA 145 may be, e.g., a polarizer or a plurality of polarizers, that receives the light with separated polarization states and transmit light having a known orientation. The two-dimensional sensor 146, which may be, e.g., a CCD or CMOS sensor array, receives the light and images the separated wavelengths at each of the plurality of polarization states of the reflected light 133. The separated wavelengths (either separated spatially or temporally) and spatially separated polarization states are distinctly imaged, e.g., are non-overlapping, by the two-dimensional sensor 146.

Figure 8:
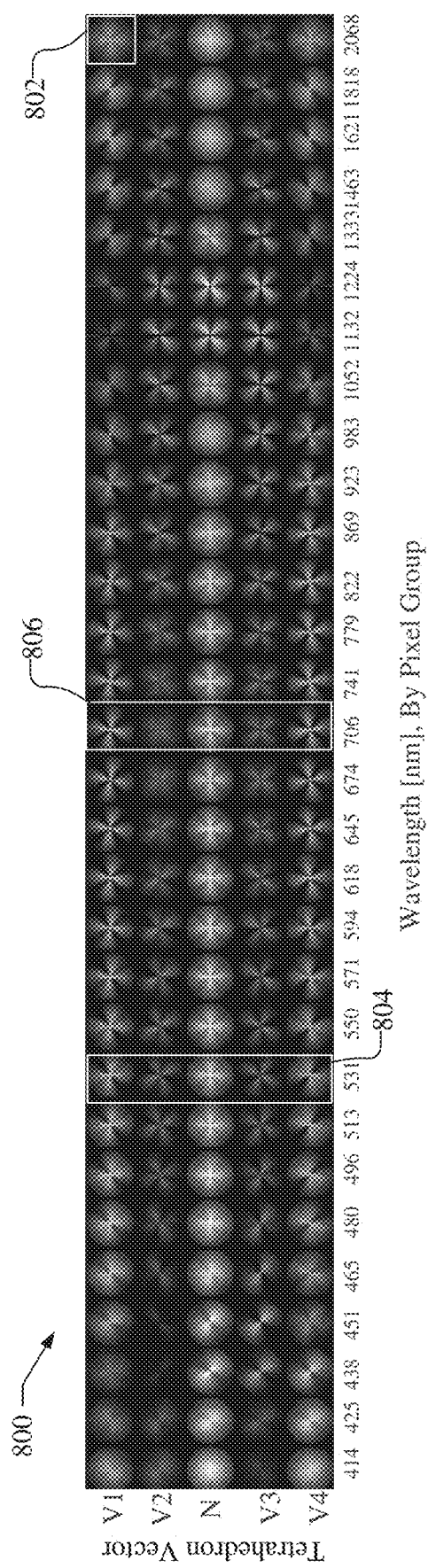
FIG. 8 illustrates a simulated image of reflected light after beam sorting performed by a wavelength diffractive element and polarization separator in the detector of the ellipsometer.

FIG. 8, by way of example, illustrates a simulated image 800 (assuming ideal optics and an uncoated Fresnel cone) of reflected light after beam sorting performed by the wavelength diffractive element 142 and the polarization separator 144 and analyzer 145, with variation of wavelengths along the X-axis and variation of polarization states along the Y-axis, labeled as tetrahedron vertices within the Poincare sphere, along with specular transmissions labeled N. The simulated image is for a 100 nm uniaxial $TiO_2$ film on Ni, which has been grown at an odd angle to the laboratory reference frame to produce off diagonal MM data. As illustrated, the image 800 includes a number diffracted "polarization order maps," one of which is identified with box 802. For example, image 800 illustrates four polarization states for 30 separate wavelengths in separate polarization order maps. Block 804, by way of example, identifies a wavelength, e.g., approximately 531 nm, with good polarization structure that will produce an accurate Mueller matrix measurement. In contrast, block 806, identifies a wavelength, e.g., approximately 706 nm, with relatively poor polarization structure. An assumed white noise of 1% maximum intensity was added to the simulation to produce image 800 in order to test measurement robustness. Dedicating even a relatively small number of pixels (25×25) to each polarization order map results in excellent accuracy even at 1% noise due to redundancy.

Figure 9:
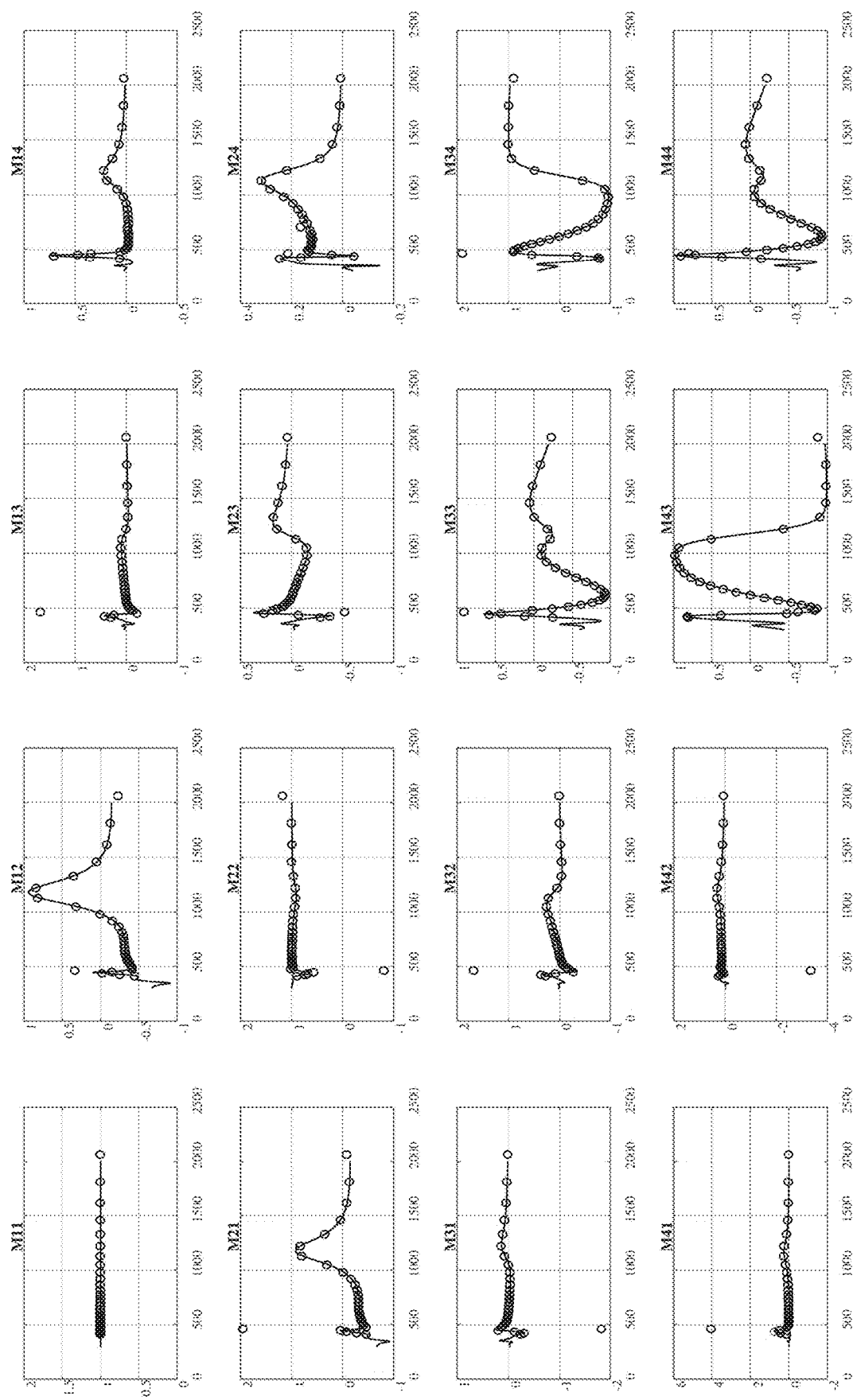
FIG. 9 illustrates Mueller matrix elements for a rotated uniaxial $TiO_2$ film simulated for an ellipsometer.

The detector 140 is coupled to a computer system 170, such as a workstation, a personal computer, central processing unit or other adequate computer system, or multiple systems. The computer system 170 is preferably included in, or is connected to or otherwise associated with ellipsometer 100. The computer system 170 may control the movement of the stage 134 and collect and analyzes the ellipsometer data obtained from the detector 140 as discussed herein. For example, the intensity of the reflected light 133 received at different calibrated positions on the two-dimensional sensor 146 simultaneously provides spectral and polarization related data from which ellipsometric parameters $\psi$ and $\Delta$ may be determined for wavelengths of interest and from which at least a partial Mueller matrix may be determined at the wavelengths of interest for the structure 132 on the sample 130 from which various parameters of the sample 130 may be determined. FIG. 9, by way of example, illustrates Mueller matrix elements for a rotated uniaxial $TiO_2$ film simulated for ellipsometer 100 where the circles represent simulated data and the lines represent theoretical data.

The computer system 170 may analyze the ellipsometric data to determine one or more physical characteristics of the sample 130. The computer system 170, which includes at least one processor 172 with memory 174, as well as a user interface including e.g., a display 176 and input devices 178. A non-transitory computer-usable storage medium 182 having computer-readable program code embodied may be used by the least one processor 172 to operate as a special purpose computer programmed to perform the techniques disclosed herein. The data structures and software code for automatically implementing one or more acts described in this detailed description can be implemented by one of ordinary skill in the art in light of the present disclosure and stored, e.g., on a computer-usable storage medium 182, which may be any device or medium that can store code and/or data for use by a computer system such as the least one processor 172. The computer-usable storage medium 182 may be, but is not limited to, magnetic and optical storage devices such as disk drives, magnetic tape, compact discs, and DVDs (digital versatile discs or digital video discs). A communication port 184 may also be used to receive instructions that are used to program the least one processor 172 to perform any one or more of the functions described herein and may represent any type of communication connection, such as to the internet or any other computer network. The communication port 184 may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

Thus, the determined one or more physical characteristics of the sample 130 may be determined by the computer system 170 and may be communicated and stored, e.g., in memory or in a database. The sample characteristics may be communicated to adjust one or more process tools associated with particular fabrication process steps in the fabrication sequence (e.g., process tools responsible for or contribute to the sample characteristic or to adjust the fabrication sequence of the sample itself.

The ellipsometer may be operated by calibrating each element between the PSG 110 and PSA 145, determining the exact initial state of the PSG for each pixel within the two-dimensional sensor 146. A single Stokes vector is a 4×1 matrix, which can fully describe a polarization state. A matrix consisting of all the polarization states generated by the PSG will be a 4-x-n matrix where n is the total number of pixels (in this example n=25*25=625). The PSD will then produce a corresponding matrix of measured values in a n-x-4 matrix. This PSG matrix is then inverted at calibration time. When data is collected from the sample, matrix multiplication is performed to produce the 4×4 Mueller matrix, from which any effects from system optics are removed.

Figure 10:
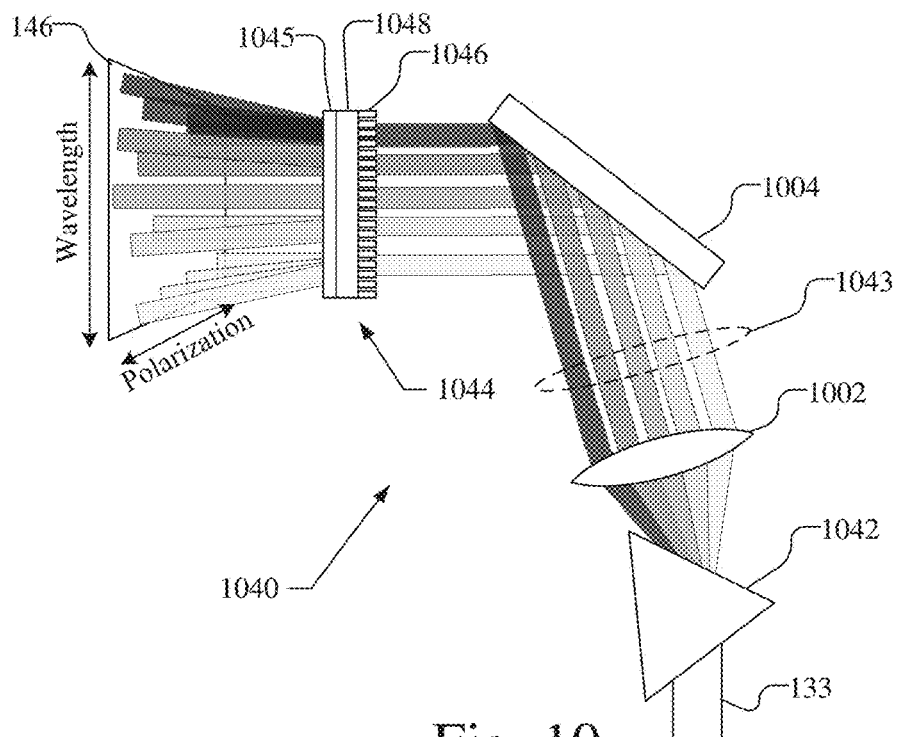
FIG. 10 is a diagram illustrating an implementation of a detector, which may be used with the ellipsometer.
Figure 11:
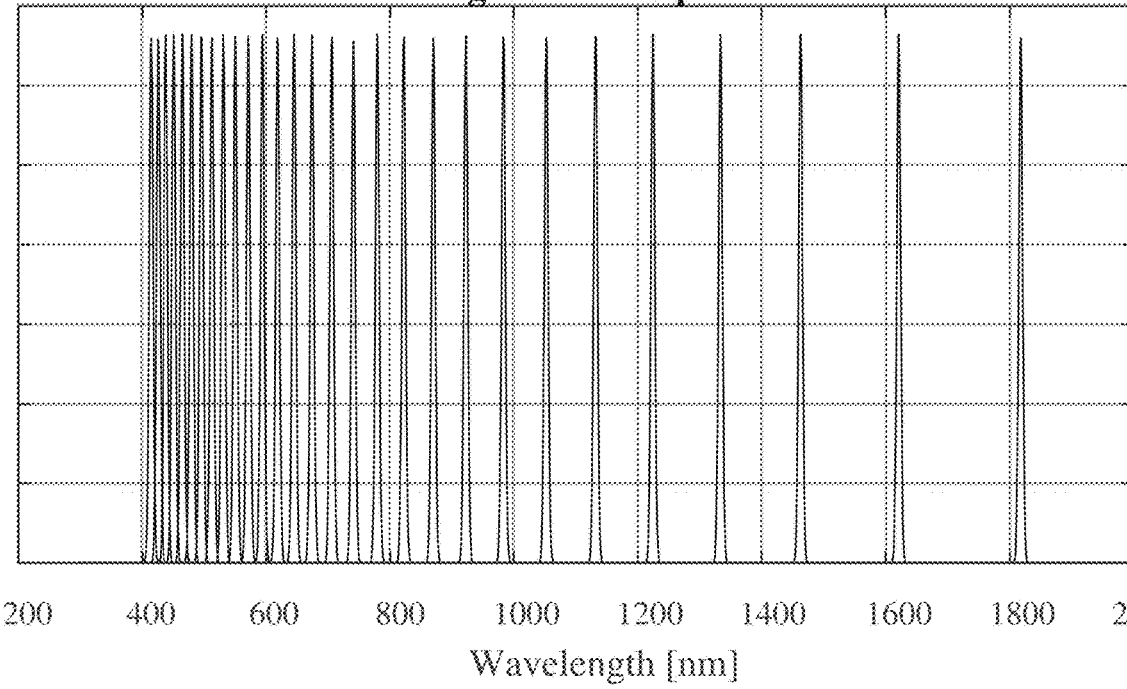
FIG. 11 illustrates a spectrum with multiple non-contiguous bands of wavelengths produced by a broadband frequency comb light source or a Fourier domain mode locked laser light source that may be used with the ellipsometer.

FIG. 10 is a diagram illustrating an implementation of a detector 1040, which may be used as the detector 140 shown in FIG. 1. Detector 1040, for example, may be used with a light source 102 (shown in FIG. 1) that produces multiple non-contiguous wavelengths. As illustrated, the reflected light 133 is received by a wavelength diffractive element 1042, e.g., illustrated as prism 1042. If desired, other types of wavelength diffractive elements may be used, such as a diffraction grating. As illustrated, the prism 1042 separates the wavelengths of the light into separate non-contiguous beams 1043. In one implementation, the separation of the light into beams with different wavelengths is due to the use of a light source 102 (shown in FIG. 1) that produces non-contiguous wavelengths, such as a broadband frequency comb light source. FIG. 11, by way of example, illustrates a light source spectrum 1100, e.g., produced by a broadband frequency comb light source, with multiple non-contiguous bands of wavelengths that may be used with the implementation of detector 1040 shown in FIG. 10.

Optical elements, e.g., lens 1002 and folding mirror 1004, direct the separated beams to a polarization separator 1044. While a single lens 1002 is illustrated, multiple optical elements may be used. Moreover, the lens elements may be refractive, reflective, or a combination thereof.

The polarization separator 1044 includes a meta-grating 1046 on one side of a transparent substrate 1048 and a polarizer 1045 on the opposite side of the substrate 1048. The meta-grating diffracts the beams 1043 into orders based on polarization, similar to a blazed grating separating wavelengths. The meta-grating 1046, for example, may be sub-wavelength three-dimensional structures on the transparent substrate 1048, which may be, e.g., glass.

Figure 12:
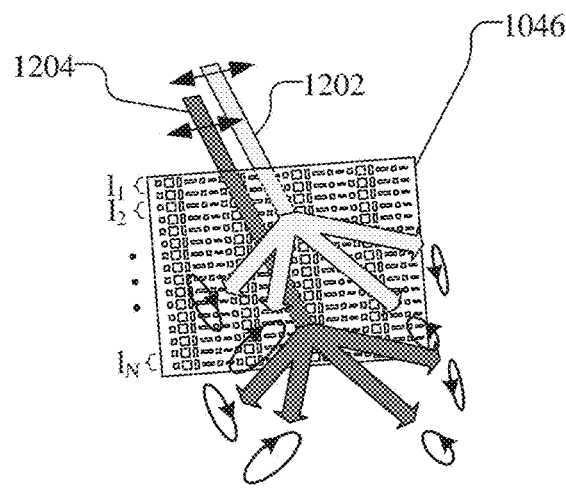
FIG. 12 illustrates an example of a meta-grating that may be used as the polarization separator in the ellipsometer.

FIG. 12 illustrates an example of the meta-grating 1046 receiving two beams 1202 and 1204 of reflected light with different wavelengths, e.g., received from the wavelength diffractive element (prism 1042 in FIG. 11). The beams 1202 and 1204 are each diffracted by the meta-grating 1046 into specified polarization states on the diffraction orders of the meta-grating 1046. The meta-grating 1046 may include multiple regions, $\lambda_1, \lambda_2, \ldots \lambda_N$, each configured to produce the same specified polarization states for different wavelengths, $\lambda_1, \lambda_2, \ldots \lambda_N$, of input light. The meta-grating 1046 may include sub-wavelength three-dimensional dielectric structures on a glass substrate.

Figure 13:
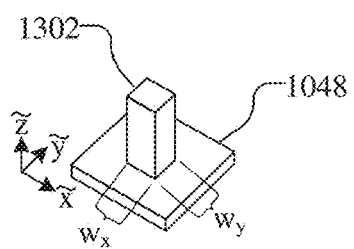
FIG. 13 illustrates a single phase shifting element that may be present on a meta-grating.

FIG. 13, for example, illustrates a single phase shifting element 1302 that may be present on the meta-grating 1046. Certain methods of fabricating a metagrating is described, e.g., in WO 2019/147828, which is incorporated herein by reference and describe as follows. A phase shifting element is made of a material that has a refractive index value significantly greater than that of a surrounding medium, such as air, at a particular wavelength, while not absorbing a light at that length. Thus, selection of material may depend on desired wavelength value or range, at which the phase shifting element will be used. In some embodiments, the phase-shifting elements may include one or more of titanium dioxide, silicon nitride, an oxide, a nitride, a sulfide, a pure element, metal or non-metal oxides, such as, alumina (e.g. Al2O3), silica (e.g. S1O2), hafnium oxide (e.g. HfCh), zinc oxide (e.g. ZnO), magnesium oxide (e.g. MgO), titania (e.g. T1O2), metal or non-metal nitrides, such as nitrides of silicon (e.g. S13N4), boron (e.g. BN) or tungsten (e.g. WN), metal or non-metal sulfides, pure elements (e.g. Si or Ge, which may be used for longer wavelengths, such near IR or mid-IR wavelengths).

The phase shifting elements 1302 may be configured such that when illuminated with an incident polarized light, light intensities for each of a pre-selected number of diffraction orders are approximately equal to each other, while light intensities for any other possible diffraction orders are much smaller, preferably at least one or at least orders of magnitude less than light intensities for the preselected diffraction orders, and more preferably below a limit of detection for a detecting element.

Figure 14:
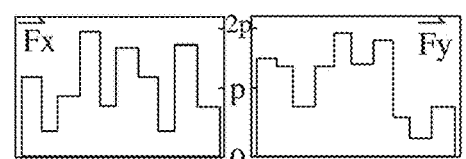
FIG. 14 illustrates a number of phase shifting elements arranged with subwavelength spacing in a one-dimensional grating unit cell that may be used in the meta-grating.
Figure 14:
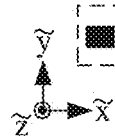

The phase shifting element 1302 is illustrated as a rectangular pillar like structure with two perpendicular mirror symmetry axes, with orthogonal dimensions $w_x$ and $w_y$, which may be configured to allow for independent phase delays $\phi_x$ and $\phi_y$, between 0 and $2\pi$, on x- and y-polarized light for a specific wavelength of light. For example, the phase shifting element 1302 may be $TiO_2$ on glass (e.g., transparent substrate 1048). If desired, shapes other than rectangular may be used for one or more phase shifting elements 1302 on the meta-grating 1046. FIG. 14 illustrates a number Q of phase shifting elements arranged with subwavelength spacing in a one-dimensional grating unit cell 1400. The phase shift experienced by x-polarized light at the $q^{th}$ position in the unit cell may be denoted as $\phi_x^{(q)}$. The discrete phase function as $\phi_x(\tilde{x})$ experienced by x-polarized light, as a function of spatial coordinate $\tilde{x}$, may be written as $\vec{\Phi}_x = \{\phi_x^1, \ldots, \phi_x^Q\}$. Y-polarized light may be treated similarly resulting in a vector $\vec{\Phi}_y$. The unit cell 1400 may be repeated over the meta-grating 1046, or within each specific wavelength region of the meta-grating 1046, to produce specific periodic phase profiles for orthogonal x and y polarizations.

As the unit cell 1400 is periodic, the angular spectrum of the grating is discrete. With phase profiles $\phi_x(\tilde{x})$ and $\phi_y(\tilde{x})$, which are contained in $\vec{\Phi}_x$ and $\vec{\Phi}_y$, the Fourier series of the phase grating may be computed and the projection onto grating order m is given by:

$$c_x^{(m)} = \langle m \mid e^{i\phi_x(\tilde{x})} \rangle = \frac{1}{2\pi} \int_0^d e^{i\phi_x(\tilde{x})} e^{i\frac{2\pi m \tilde{x}}{d}} d\tilde{x} \quad \text{eq. 1}$$

and $$c_y^{(m)} = \langle m \mid e^{i\phi_y(\tilde{x})} \rangle = \frac{1}{2\pi} \int_0^d e^{i\phi_y(\tilde{x})} e^{i\frac{2\pi m \tilde{x}}{d}} d\tilde{x} \quad \text{eq. 2}$$

The value d is the length of the unit cell 1400 and $\{c_x^{(m)}\}$ and $\{c_y^{(m)}\}$ are the Fourier coefficients of the gratings experienced by x and y polarizations, respectively.

Each coefficient is in general complex, and may be written $c_x^{(m)} = |c_x^{(m)}| e^{i\delta(m)}$ and $c_y^{(m)} = |c_y^{(m)}| e^{i\delta(m)}$. A Jones matrix J(m) may be ascribed to each order:

$$J(m) = \begin{bmatrix} c_x^{(m)} & 0 \\ 0 & c_y^{(m)} \end{bmatrix} = \begin{bmatrix} |c_x^{(m)}| & 0 \\ 0 & |c_y^{(m)}| \end{bmatrix} \begin{bmatrix} e^{i\delta(m)} & 0 \\ 0 & e^{i\delta(m)} \end{bmatrix} \quad \text{eq. 3}$$

The polarization properties of order m contained in J(m) may be seen as equivalent to a cascade of two bulk optical elements: the first Jones matrix in the product is that of a diattenuator, e.g., an imperfect polarizing element selectively attenuating light along the x and y directions, while the second Jones matrix is that of a phase retarder, e.g., a waveplate, with retardance $\delta^{(m)} = \delta_x^{(m)} - \delta_y^{(m)}$. Both have their eigenaxes mutually oriented along x and y.

If a beam linearly polarized at, e.g., 45° with electric field amplitude $E_0$ is incident on the grating, the electric field on the $m^{th}$ grating order will be:

$$\vec{E}^{(m)} = \frac{E_0}{\sqrt{2}} \begin{Bmatrix} c_x^{(m)} \\ c_y^{(m)} \end{Bmatrix} \qquad \text{eq. 4}$$

In the special case of 45° polarized light, then, the complex grating coefficients $\{c_x^{(m)}\}$ and $\{c_y^{(m)}\}$ directly yield the polarization state of order m. For a general input polarization, the output polarization state on each order can be understood with aid of the Poincare sphere.

Each wavelength region of the meta-grating may include a different unit cell tailored for its specific wavelength. The phase profile vectors $\vec{\Phi}_x$ and $\vec{\Phi}_y$ may be optimized to produced desired polarizations at each order. For example, the shape of each phase shifting element 1302 and inter-element separation of elements in the unit cell 1400 may be optimized for each desired wavelength and to produce a consistent angular separation of the grating orders. More formally, it may be desired to design a grating that, when there is incident light that is linearly polarized at 45°, desired polarization states on a set of grating orders $\{\ell\}$, are produced. The target Jones vector on each order $m \in \{l\}$ is given as:

$$\vec{j}^{(m)} = \begin{bmatrix} \cos\chi^{(m)} \\ \sin\chi^{(m)} e^{i\phi^{(m)}} \end{bmatrix} \qquad \text{eq. 5}$$

Light will generally be diffracted into all orders, not just those in $\{\ell\}$. In order to direct as much of the incident power as possible into these desired orders, it is sought to maximize $$\eta(\vec{\Phi}_x, \vec{\Phi}_y) = \sum_{m \in \{\ell\}} \sqrt{\left(c_x^{(m)}(\vec{\Phi}_x)\right)^2 + \left(c_y^{(m)}(\vec{\Phi}_y)\right)^2} \qquad \text{eq. 6}$$

under the constraints $$\frac{|c_y^{(m)}|}{|c_x^{(m)}|} = \tan\chi^{(m)} \qquad \text{eq. 7}$$

and $$\delta_x^{(m)} - \delta_y^{(m)} = \phi^{(m)} \qquad \text{eq. 8}$$

The constraints provide for the desired polarization on each order, and the phase profile vectors $\vec{\Phi}_x$ and $\vec{\Phi}_y$ are the quantities to be optimized. If the grating has Q constituent elements, the optimization will involve 2Q parameters. Q and the inter-element separation dictate the grating period d which, along with the operating wavelength λ, specifies the angular separation of the grating orders. Once optimized $\vec{\Phi}_x$ and $\vec{\Phi}_y$ are obtained, the power in the desired orders and correspondence with the target polarization can be mathematically evaluated using equations 6, 7, and 8.

Figure 15A:
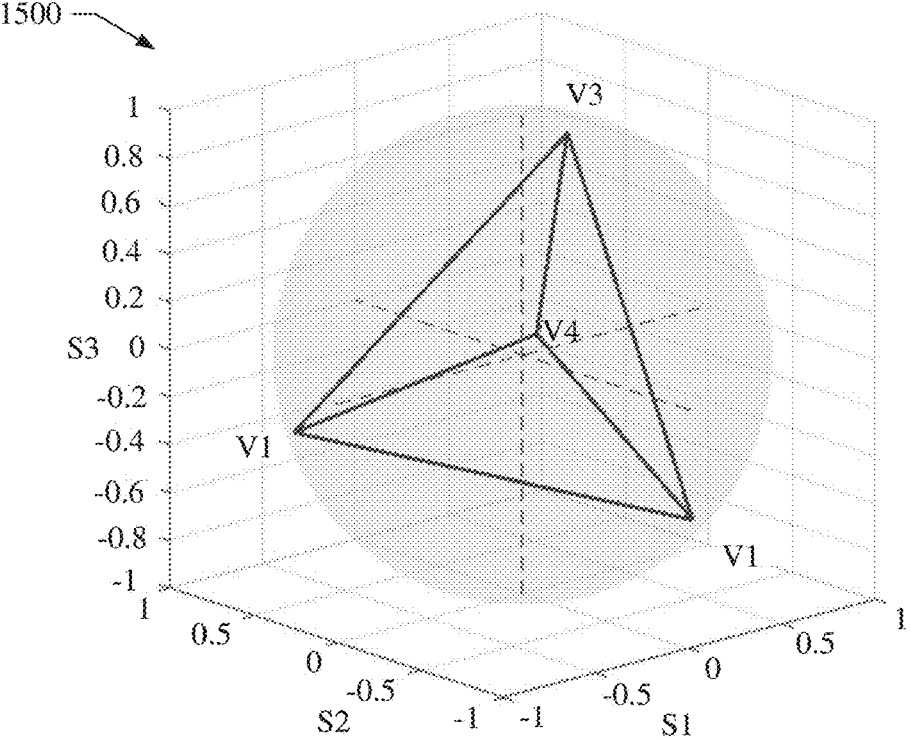
FIGS. 15A, 15B, and 15C illustrate the vertices within a Poincare sphere.
Figure 15B:
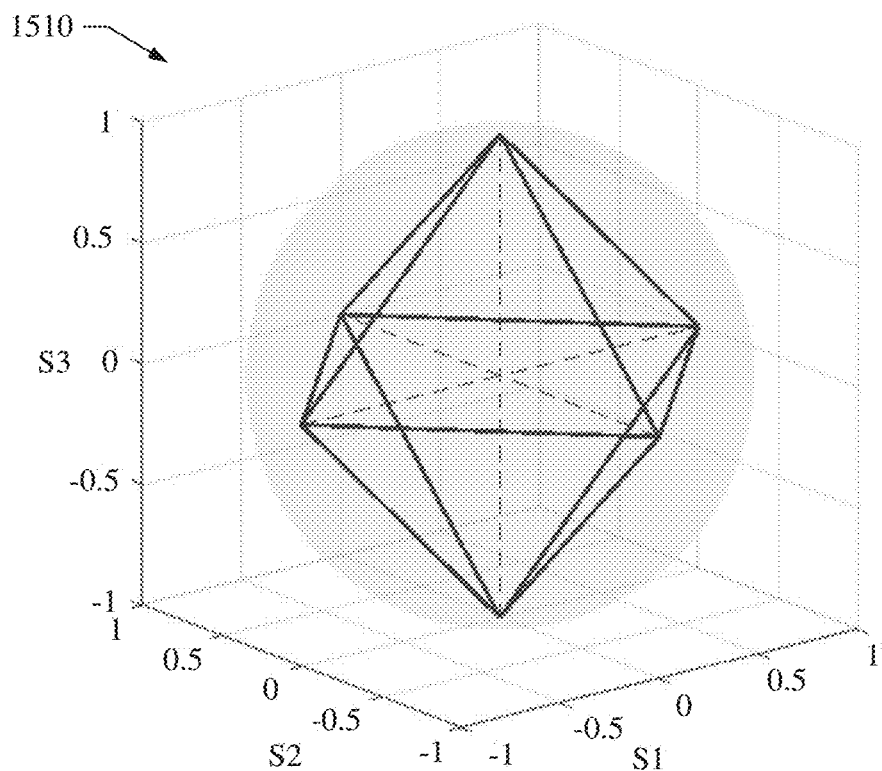
Figure 15C:
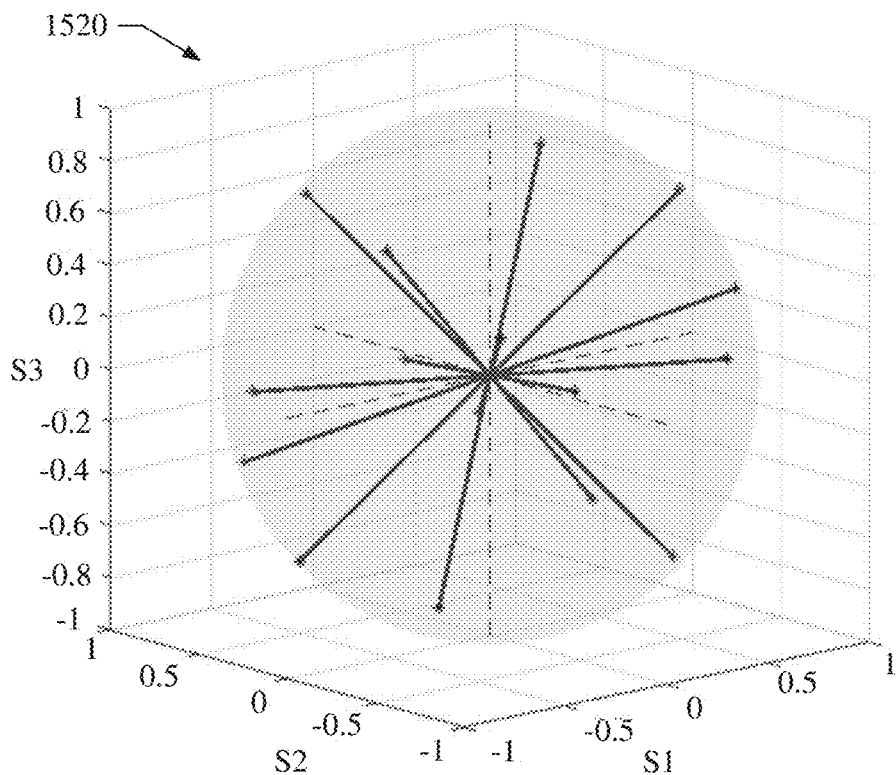

A gradient descent optimization may be performed of $\eta(\vec{\Phi}_x, \vec{\Phi}_y)$ under the above constraints, with randomly generated initial conditions. Once optimized $\{\vec{\Phi}_x, \vec{\Phi}_y\}$ are found, appropriate phase shifting geometries in the material of interest may be deduced. the geometries of appropriate phase shifters may be located from a library of simulated structures, once the operating wavelength and desired material platform are specified. For example, a search method may be used to maximize the amount of power delivered to the −2, −1, 1, and 2 orders, e.g., using seed values, varying the sizes of the pillars, and simulating results until a "best" set is found. Thus, the meta-grating 1046 may be configured for each desired wavelength to produce the vertices of the best-measurement tetrahedron within the Poincare sphere 1500, as illustrated in FIG. 15, which ensures a high quality ellipsometry measurement.

Referring back to FIG. 10, the wavelength and polarization state sorted beams are received by the two-dimensional sensor 146, with variation of wavelengths along one axis and variation of polarization states along the other axis.

Figure 16:
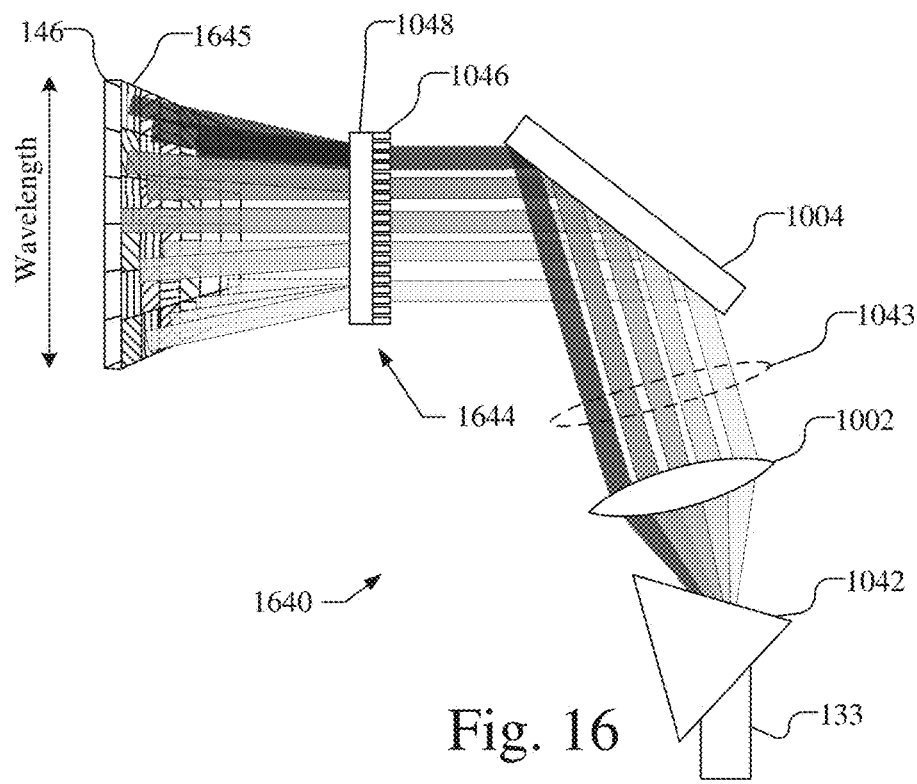
FIG. 16 is a diagram illustrating another implementation of a detector, which may be used with the ellipsometer.

FIG. 16 is a diagram illustrating another implementation of a detector 1640, which may be used as the detector 140 shown in FIG. 1. Detector 1640, for example, may be used with a light source 102 (shown in FIG. 1) that produces multiple non-contiguous wavelengths, such as a broadband frequency comb light source or a Fourier domain mode locked laser light source, as discussed above. As illustrated, the reflected light 133 is received by a wavelength diffractive element, e.g., illustrated as a prism 1042. If desired, other types of wavelength diffractive elements may be used, such as a diffraction grating.

Optical elements, e.g., lens 1002 and folding mirror 1004, direct the separated beams to a polarization separator 1644. While a single lens 1002 is illustrated, multiple optical elements may be used. Moreover, the lens elements may be refractive, reflective, or a combination thereof.

The polarization separator 1644 includes meta-grating 1046 on one side of the transparent substrate 1048. As described above, the meta-grating diffracts the beams 1043 into orders based on polarization, similar to a blazed grating separating wavelengths. The meta-grating 1046, for example, may be sub-wavelength three-dimensional structures on the transparent substrate 1048, which may be, e.g., glass. As illustrated, there may be no polarizer on the substrate 1048.

The detector 1640 includes a micropolarizer array 1645 that is aligned with the two-dimensional sensor 146, such as the 4D Polarcam produced by 4D Technologies, an Onto Innovation business. The micropolarizer array 1645 includes an array of polarizers to acquire a number, e.g., four, polarization angles, simultaneously. Each polarizer in the array of polarizers is aligned with a detector pixel in the two-dimensional sensor 146. The micropolarizer array 1645 and meta-grating 1046 act as the acts as a polarization state analyzer.

Figures 17A, 17B:
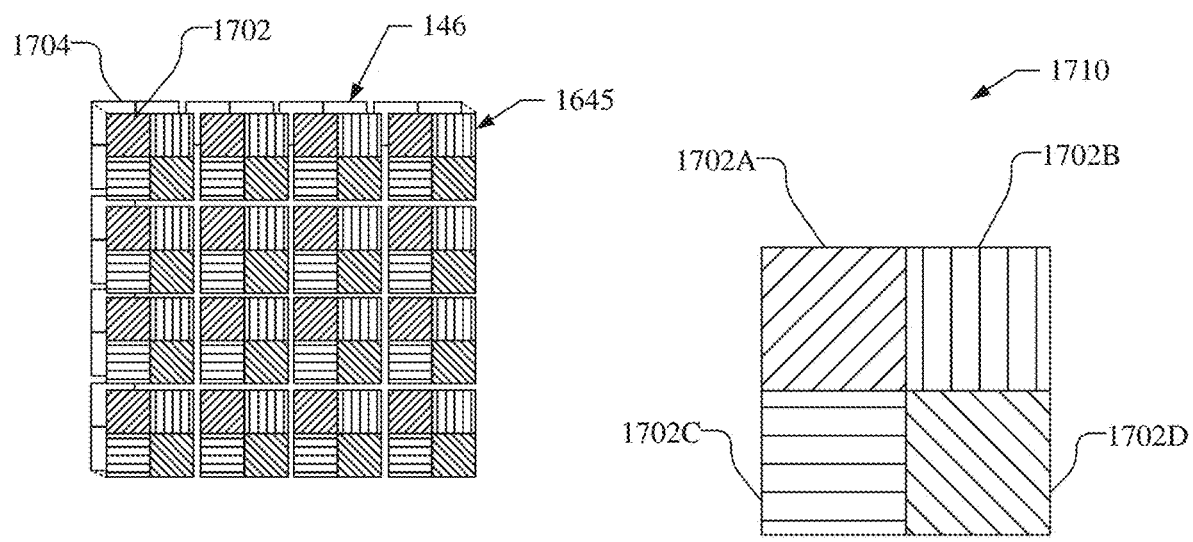
FIG. 17A illustrates one implementation of a micropolarizer array and two-dimensional sensor that may be used with the ellipsometer.
FIG. 17B illustrates a unit cell of four micropolarizer pixels in the micropolarizer array.

FIG. 17A illustrates one implementation of a micropolarizer array 1645, which includes a plurality of micropolarizer pixels 1702, each aligned with a detector pixel 1704 in the two-dimensional sensor 146. FIG. 17B, for example, illustrates a unit cell 1710 of four micropolarizer pixels 1702A, 1702B, 1702C, and 1702D (collectively referred to as micropolarizer pixels 1702), each with a different polarization orientation. Each of the micropolarizer pixels 1702 is, e.g., a wire grid polarizer, held in a 2×2 array with four discrete polarizations (e.g., 0°, 45°, 90°, 135°) in the unit cell 1710. The unit cell 1710 is repeated over the entire micropolarizer array 1645, so that the micropolarizer array 1645 includes a repeated array of micropolarizer pixels 1702 having discrete polarizations. The micropolarizer pixels 1702 have a size and spacing that match the size and spacing of the detector pixels 1704 of the two-dimensional sensor 146, so that each detector pixel 1704 in the two-dimensional sensor 146 is matched, i.e., aligned, with a micropolarizer pixel 1702.

With the arrangement of polarizations within a unit cell 1710 and the arrangement of a unit cell 1710 in the micropolarizer array 1645 illustrated in FIGS. 17A and 17B, it should be understood that the two-dimensional sensor 146 will receive an image of spatially separated wavelengths, which may vary along one axis, but the variation of polarization states will not be identified along the other axis (as illustrated in FIG. 8), but will be identified on a pixel level, e.g., based on pixels aligned with the micropolarizer pixels 1702. It should be understood, however, that FIGS. 17A and 17B illustrate one implementation of the arrangement of polarizations within a unit cell 1710 and the arrangement of a unit cell 1710 in the micropolarizer array 1645 and that other arrangements may be possible, including combining groups of pixels having similar polarization orientations, and other arrangements of the groups of pixels.

In the current implementation, the micropolarizer array 1645 replaces polarizer 1045 shown in FIG. 10. With the use of an array of different polarization orientations from the micropolarizer array 1645 along with the separation of the light into a number of different polarization states from the meta-grating 1046, the measurement accuracy of the system may be increased, e.g., by normalizing the measurement. For example, with four separate polarization states from the meta-grating 1046 and four separate polarizers per unit cell 1710 in the micropolarizer array 1645, sixteen measurements are generated (4×4=16). In one implementation, rather than using a best-measurement tetrahedron of the Poincare sphere, as discussed above, measurements may be made using all six orthogonal states of the Poincare sphere in order to accurately characterize the polarization state, as illustrated by Poincare sphere 1510 in FIG. 15B. The PSA projects the polarization of the beam onto the four best measurement vertices of the Poincare sphere 1510. Since a single polarizer coupled with the meta-grating 1046 will produce four vertices, one of the polarizer orientations in the micropolarizer array 1645 will may produce the four best measurement vertices. The other polarizer orientations of the micropolarizer array 1645 may be used to provide orthogonal points which will increase the accuracy of the polarization measurement.

FIG. 18 is a diagram illustrating another implementation of a detector 1840, which may be used as the detector 140 shown in FIG. 1. Detector 1840, for example, may be used with a light source 102 (shown in FIG. 1) that produces a continuous spectrum of wavelengths. As illustrated, the reflected light 133 is received by a wavelength diffractive element, e.g., illustrated as a prism 1042. If desired, other types of wavelength diffractive elements may be used, such as a diffraction grating. The prism 1042 separates the wavelengths of the light into separate wavelengths but, as illustrated, the resulting light 1843 is a continuous spectrum of wavelengths, i.e., multiple contiguous wavelengths. The prism 1042 produces a continuum of wavelengths, for example, because the broadband light source 102 (shown in FIG. 1) produces a continuous spectrum of light. FIG. 19, for example, illustrates an example of the spectrum 1900 produced by light source 102 for the current implementation of detector 1840.

Optical elements, e.g., lens 1002 and folding mirror 1004, direct the separated beams to a polarization separator 1644. While a single lens 1002 is illustrated, multiple optical elements may be used. Moreover, the lens elements may be refractive, reflective, or a combination thereof.

The polarization separator 1044, includes meta-grating 1046 on one side of the transparent substrate 1048 and a polarizer 1045 on the other side of the substrate 1048. As described above, the meta-grating diffracts the beams 1043 into orders based on polarization, similar to a blazed grating separating wavelengths. The meta-grating 1046, for example, may be sub-wavelength three-dimensional structures on the transparent substrate 1048, which may be, e.g., glass.

The detector 1840 includes a wavelength filter 1802 between the two-dimensional sensor 146 and the polarization separator 1044. The wavelength filter 1802 may be one or more band pass filters or an etalon filter. For example, the wavelength filter 1802 may include passbands and geometrical widths that are designed to match the beam. The wavelength filter 1802 may be on the surface of the two-dimensional sensor 146 or on the polarizer 1045 or in between. The wavelength filter 1802 receives the light from the polarization separator 1044 and transmits distinct bands of wavelengths to produce multiple non-overlapping, non-contiguous bands of wavelengths that are imaged by the two-dimensional sensor 146.

Figure 18A:
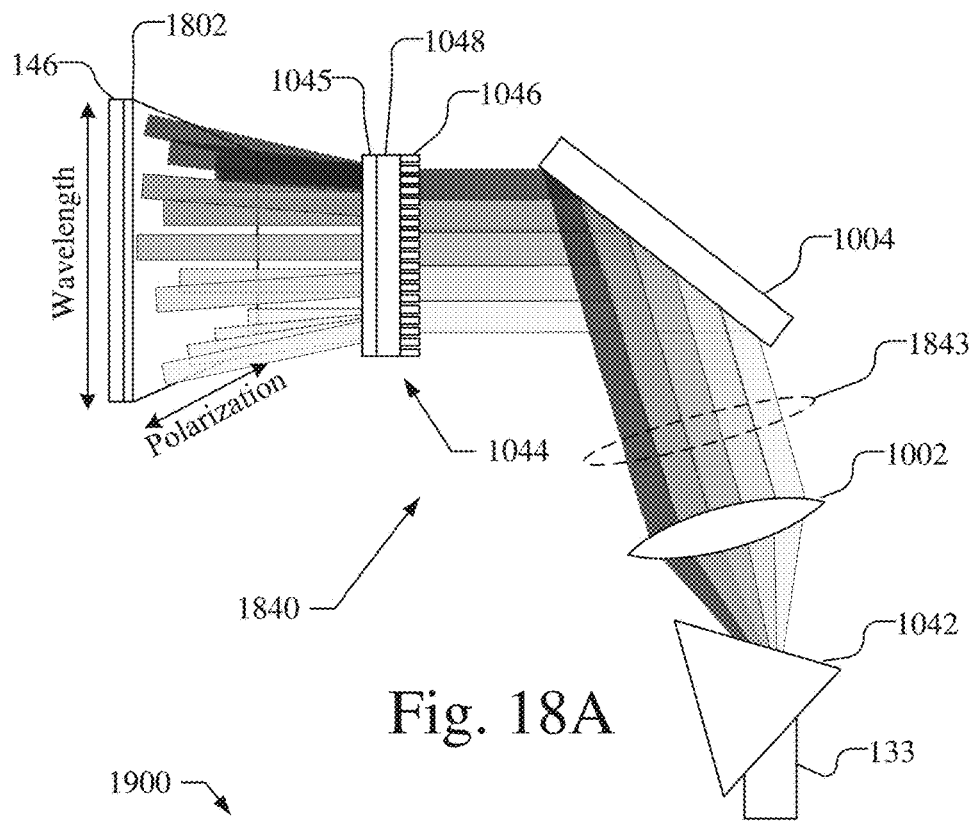
FIG. 18A is a diagram illustrating another implementation of a detector, which may be used with the ellipsometer
Figure 18B:
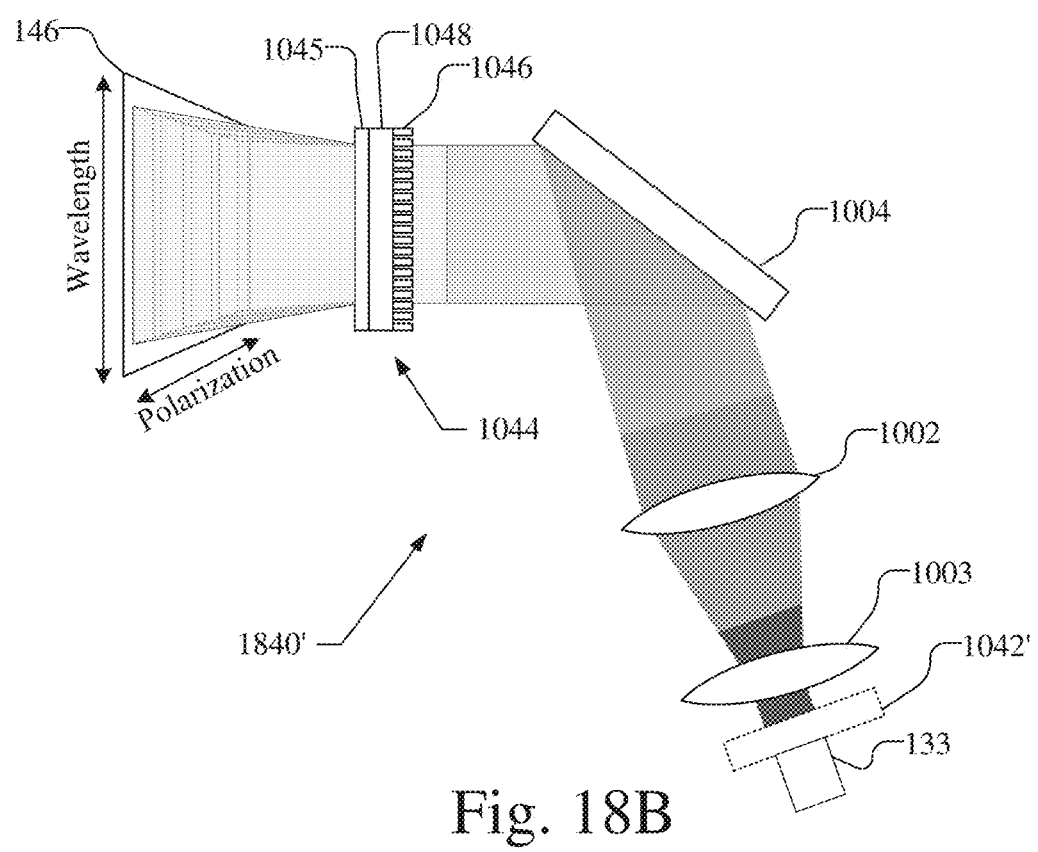
FIG. 18B is a diagram illustrating another implementation of a detector, which may be used with the ellipsometer

FIG. 18B is a diagram illustrating another implementation of a detector 1840', similar to detector 1040 shown in FIG. 10, like designated elements being the same, and which may be used as the detector 140 shown in FIG. 1. Detector 1840', for example, may be used with a light source 102 (shown in FIG. 1) that produces multiple wavelengths simultaneously or sequentially. As illustrated, the wavelengths in reflected light 133 is temporally separated a wavelength separator 1042', which in one implementation may be an acousto-optic tunable filter that separates wavelengths in the reflected light 133 (using diffraction in this instance) into narrow bands of wavelengths and quickly switches between each band, e.g., 200 ns, to capture each band of wavelength over time. A wavelength separator 1042', such as an acousto-optic tunable filter may be used with a light source that produces multiple wavelengths simultaneously. In another implementation, the wavelengths in reflected light 133 may be temporally separated, as illustrated, by light source 102 (shown in FIG. 1), e.g., a Fourier domain mode locked laser light source, that produces multiple wavelengths sequentially. In this implementation, the wavelength separator 1042' is the light source 102, and a physical wavelength separate 1042' need not be present in the detector 1840' as indicated by the dotted lines. The two-dimensional sensor 146 need not include the wavelength filter 1802 but collects multiple frames at high-speed, synchronized with the wavelength separator 1042', e.g., the acousto-optic tunable filter or the light source 102, to capture the separated polarization states for a different wavelength in each frame. As illustrated, optical elements, e.g., lenses 1002 and 1003 and folding mirror 1004, direct the beam with temporally separated wavelengths to the polarization separator 1044.

Figure 19:
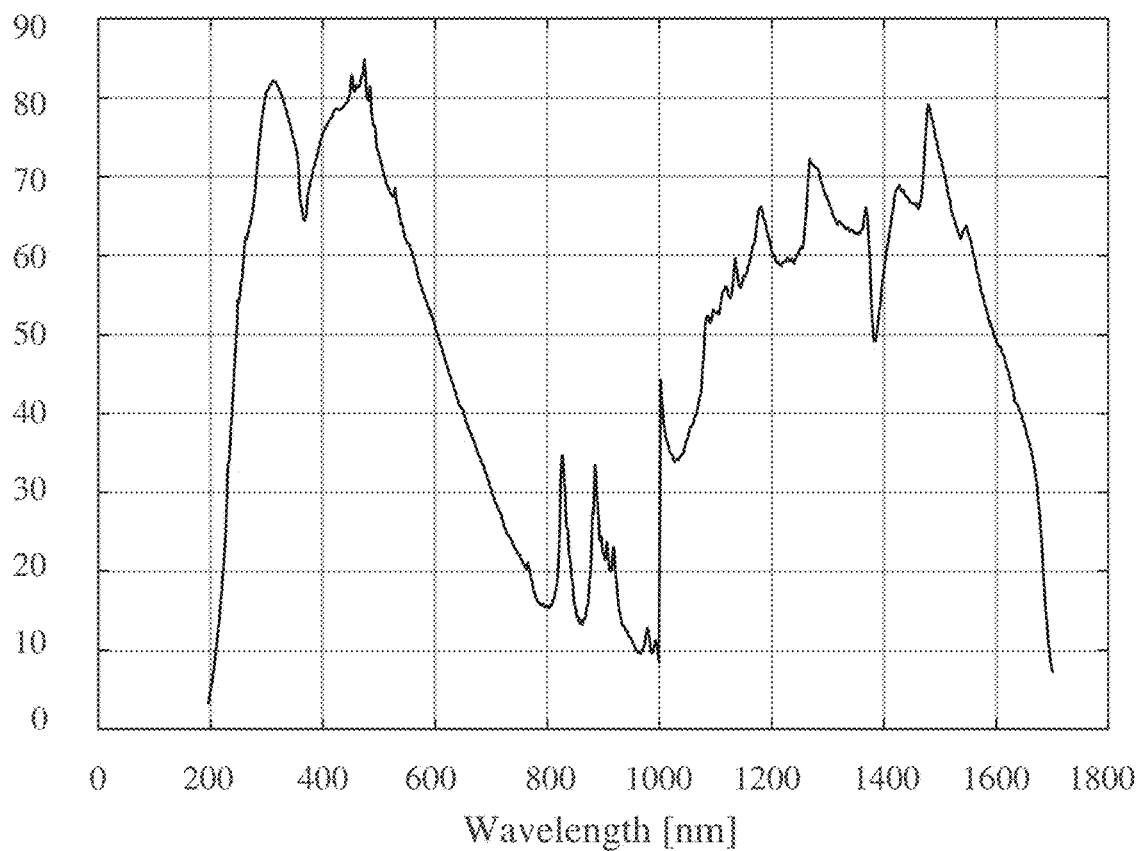
FIG. 19 illustrates a continuous spectrum of wavelengths that may be produced by a broadband light source that may be used with the ellipsometer.

In some implementations, a detector may include a micropolarizer array 1645, e.g., as described in FIG. 16, but may use continuous with a light source 102 (shown in FIG. 1) that produces a continuous spectrum of wavelengths, e.g., using a wavelength filter 1802, as discussed in FIG. 18A. Moreover, in some implementations, a detector may include a micropolarizer array 1645, e.g., as described in FIG. 16, but may use temporally separated wavelengths, e.g., using a wavelength separator 1042' as discussed in FIG. 18B.

Figure 20:
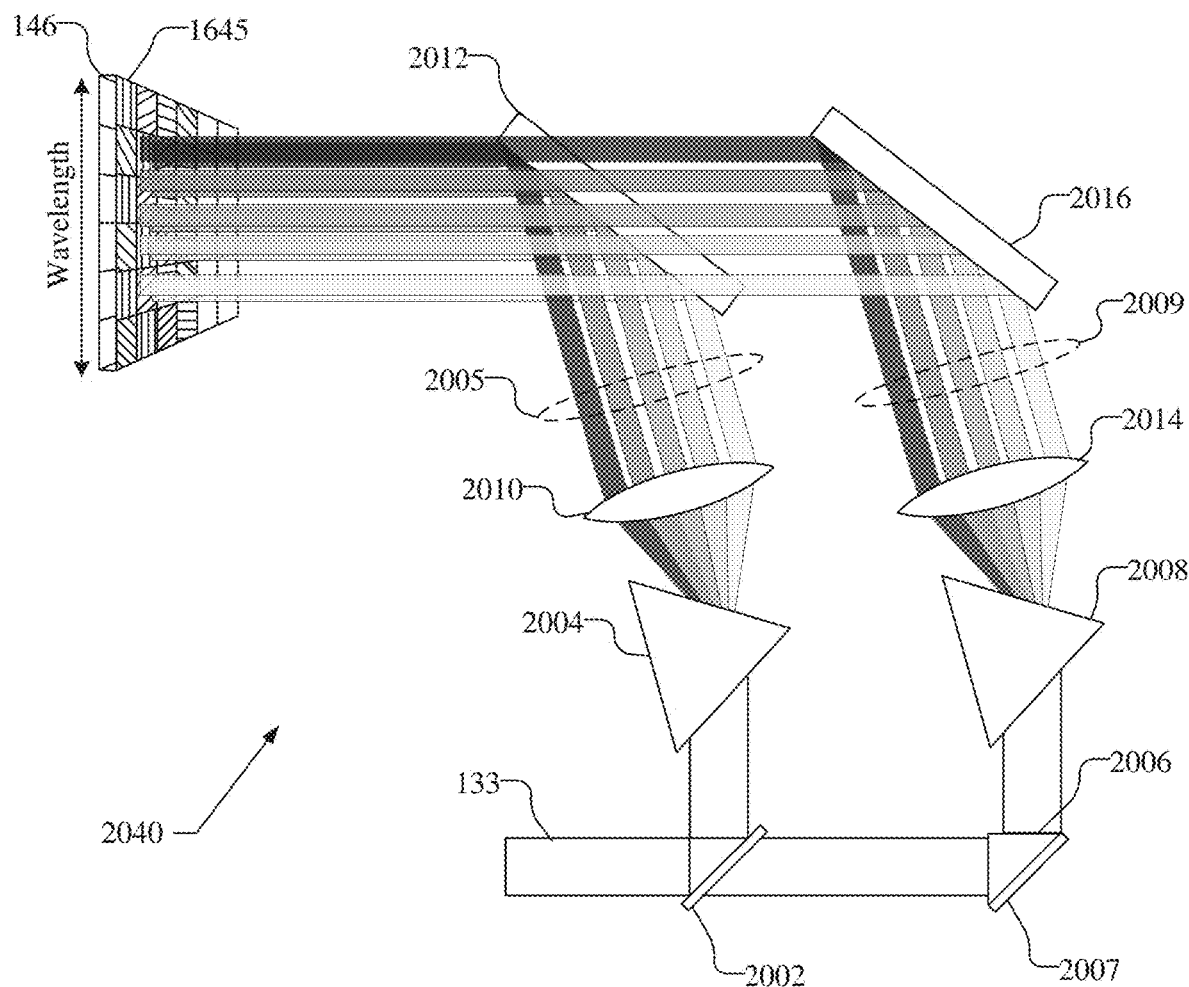
FIG. 20 is a diagram illustrating another implementation of a detector, which may be used with the ellipsometer

FIG. 20 is a diagram illustrating another implementation of a detector 2040, which may be used as the detector 140 shown in FIG. 1. Detector 2040, for example, may be used with a light source 102 (shown in FIG. 1) that produces multiple non-contiguous wavelengths, such as a broadband frequency comb light source, as discussed above. As shown, the reflected light is received by a beam splitter 2002 that directs, e.g., reflects, a portion of the reflected light 133 into a first channel towards a first diffractive element, illustrated as prism 2004. The remaining portion of reflected light 133 from the beam splitter 2002 is directed, e.g., transmitted, towards a second channel with a second diffractive element, illustrated as prism 2008, via a phase shifting optical element illustrated as a Fresnel prism 2006. The Fresnel prism 2006, which includes an optical coating 2007, introduces a 90° phase shift between linear polarization state of the reflected light 133. The Fresnel prism 2006 and optical coating 2007, for example, may be similar to the Fresnel cone 116 and optical coating 212. If desired, other phase shifting optical elements instead of a Fresnel prism may be used. Thus, the light in the first channel and the light in the second channel have different polarization states. As illustrated, prisms 2004 and 2008 each separate the wavelengths of the light into separate non-contiguous beams 2005 and 2009 that are directed to a micropolarizer array 1645 aligned with a two-dimensional sensor 146, as detailed in FIG. 16. As illustrated, in detector 2040, the meta-grating 1046 from FIG. 10 is removed from the system, as it is functionally replaced by the beam splitter 2002 and the Fresnel prism 2006, which direct light having different polarization states towards the micropolarizer array 1645, and in combination act as the polarization state analyzer.

Optical elements, e.g., lens 2010 and folding mirror 2012 in the first channel, and lens 2014 and folding mirror 2016 in the second channel, direct the separated beams towards the two-dimensional sensor. While a single lens 2010 and 2014 are illustrated in each channel, multiple optical elements may be used. Moreover, the lens elements may be refractive, reflective, or a combination thereof.

As illustrated, a single micropolarizer array 1645 and two-dimensional sensor 146 may be used, e.g., by imaging the light from the first and second channels in different regions of the micropolarizer array 1645 and two-dimensional sensor 146. If desired, two micropolarizer arrays 1645/two-dimensional sensors 146 may be used, one for each of the channels.

As discussed above, with the arrangement of polarizations within a unit cell 1710 and the arrangement of a unit cell 1710 in the micropolarizer array 1645 illustrated in FIGS. 17A and 17B, it should be understood that the two-dimensional sensor 146 in detector 2040 will receive an image of spatially separated wavelengths, which may vary along one axis, but the variation of polarization states will not be identified along the other axis (as illustrated in FIG. 8), but will be identified on a pixel level, e.g., based on pixels aligned with the micropolarizer pixels 1702. It should be understood, however, that FIGS. 17A and 17B illustrate one implementation of the arrangement of polarizations within a unit cell 1710 and the arrangement of a unit cell 1710 in the micropolarizer array 1645 and that other arrangements may be possible, including combining groups of pixels having similar polarization orientations, and other arrangements of the groups of pixels.

In the current implementation, the meta-grating is removed from the system and is functionally replaced with a phase shifting optical element (Fresnel prism 2006) and beam splitter 2002, which direct two different polarization states towards the micropolarizer array 1645. With the use of an array of different polarization orientations from the micropolarizer array 1645 along with the different polarization states provided by the separate channels, the measurement accuracy of the system may be increased, e.g., by normalizing the measurement. For example, with two separate polarization states from the Fresnel reflector 2006 and beam splitter 2002 and four separate polarizers per unit cell 1710 in the micropolarizer array 1645, eight measurements are generated (2×4=8) over 6 orthogonal polarization states in which 2 are duplicates. By duplicating the measurement, one channel is normalized with respect to the other channel to ensure an accurate measurement, as illustrated by Poincare sphere 1520 in FIG. 15C. This procedure achieves the same measurement accuracy as the best-measurement tetrahedron 1500 shown in FIG. 15A discussed above. In one implementation, the orientations of the micropolarizer pixels 1702 in the micropolarizer array 1645 are configured with respect to the Fresnel reflector 2006 such that the measured polarization states trace out two orthogonal rings around the Poincare sphere using the separated wavelengths in the reflected light from the prism 2004 and the separated wavelengths in the reflected light from the prism 2008. The intersections of the two orthogonal rings, for example, may be used by one two-dimensional sensor that received both channels or to reference a first two-dimensional sensor to the second two-dimensional sensor if more than one two-dimensional sensor is used.

Figure 21:
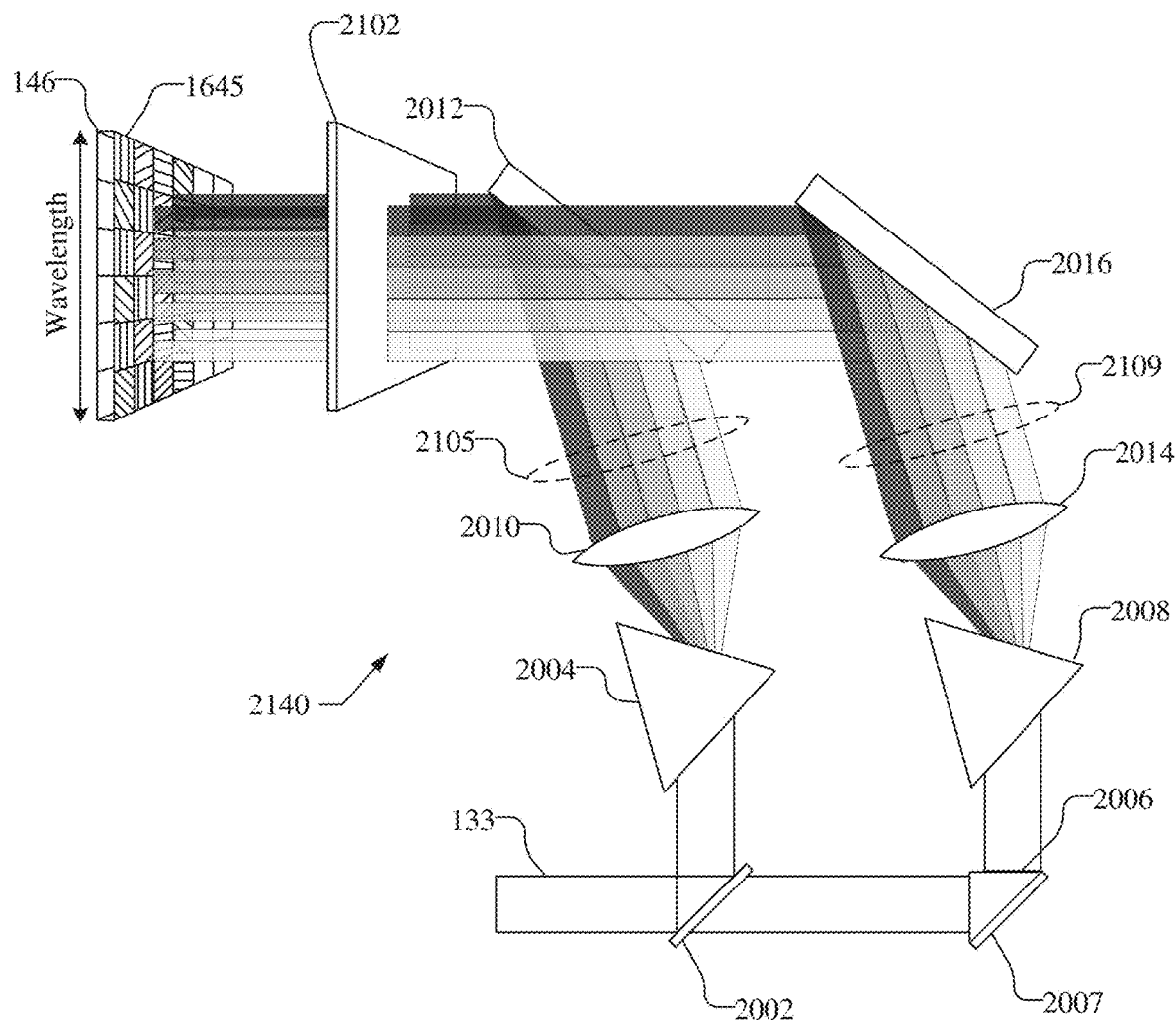
FIG. 21 is a diagram illustrating another implementation of a detector, which may be used with the ellipsometer

FIG. 21 is a diagram illustrating another implementation of a detector 2140, which may be used as the detector 140 shown in FIG. 1. Detector 2140, for example, may be used with a light source 102 (shown in FIG. 1) that produces a continuous spectrum of wavelengths, as discussed above. Detector 2140 is similar to the detector 2040, shown in FIG. 20, like designated elements being the same. As illustrated, in detector 2140, the prisms 2004 and 2008 separate the wavelengths of light, but because the light source 102 produces a continuous spectrum, the resulting light 2105 and 2109, respectively, include continuous spectra of wavelengths, i.e., multiple contiguous wavelengths. In order to produce multiple non-overlapping, non-contiguous bands of wavelengths imaged by the micropolarizer array 1645 and two-dimensional sensor 146, a wavelength filter 2102 is used in detector 2140. The wavelength filter 2102, for example, is placed between the micropolarizer array 1645 and the prisms 2004, 2008, and may be, for example, located on the micropolarizer array 1645. If desired, multiple wavelengths filters may be used, and in some implementations, separate, but matching, wavelength filters may be located within the first channel, e.g., on folding mirror 2012, and within the second channel, e.g., on folding mirror 2016. Wavelength filter 2102 is configured to allow only desired wavelengths to reach the micropolarizer array 1645 and two-dimensional sensor 146 so that the desired bands of wavelengths are non-overlapping.

Moreover, in some implementations, a detector may include a beam splitter 2002 and the phase shifting optical element (Fresnel prism 2006), e.g., as discussed in FIGS. 20 and 21, but may also use temporally separated wavelengths, e.g., using a wavelength separator 1042' as discussed in FIG. 18B. As discussed above, the wavelength separator 1042' may be an acousto-optic tunable filter that separates wavelengths in the reflected light 133 where the light source produces multiple wavelengths simultaneously and the two-dimensional sensor 146 collects multiple frames synchronized with the acousto-optic tunable filter. In another implementation, the light source may produce multiple wavelengths sequentially, e.g., a Fourier domain mode locked laser light source, and the wavelength separator 1042' may be considered the high speed two-dimensional sensor 146 that collects multiple frames synchronized with the light source.

Figure 22:
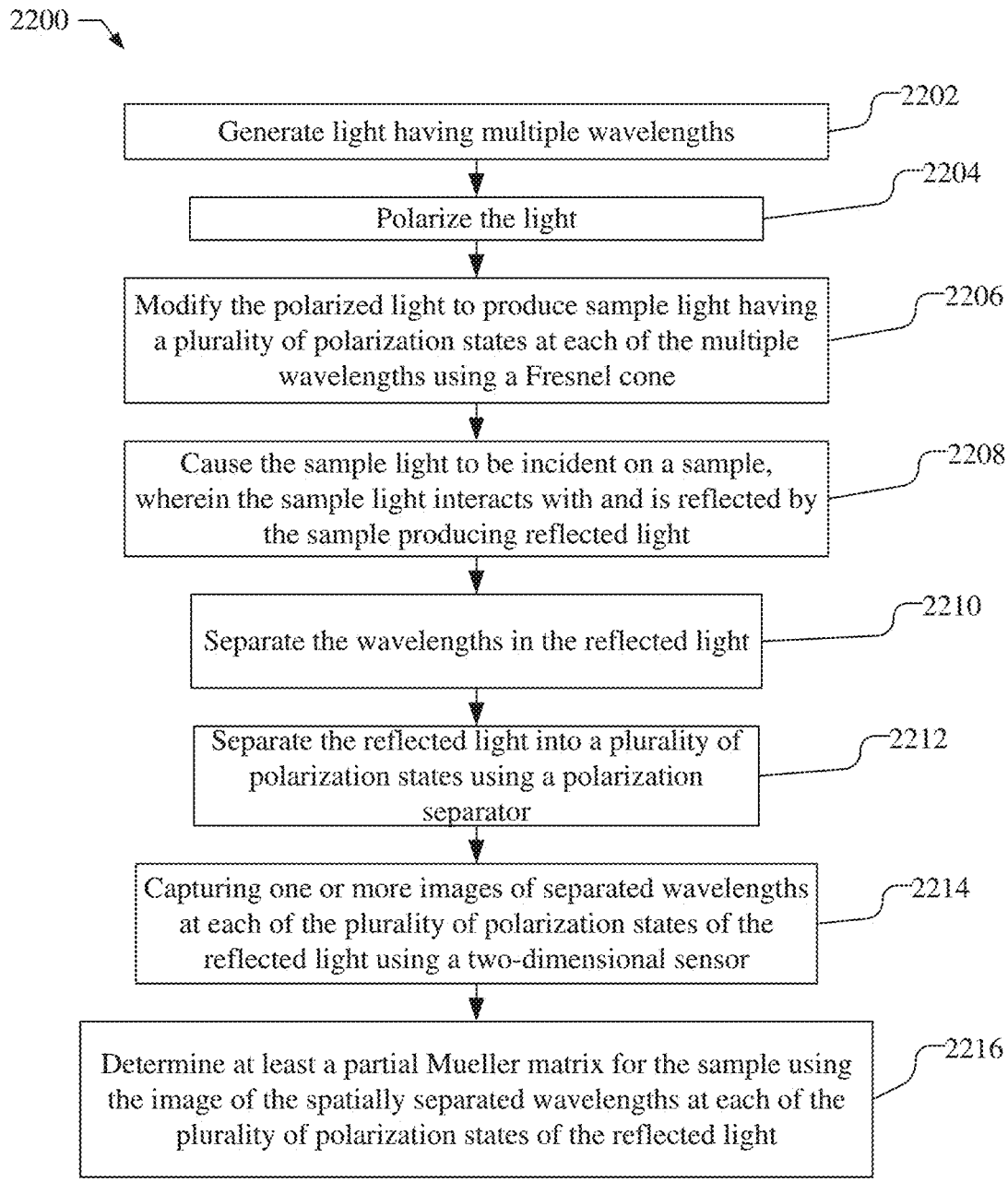
FIG. 22 is a flow chart illustrating a method of characterizing a sample with an ellipsometer, as disclosed herein.

FIG. 22 is a flow chart 2200 illustrating a method of characterizing a sample with an ellipsometer, such as ellipsometer 100, discussed herein. As illustrated in a first block 2202, light having multiple wavelengths is generated, e.g., as discussed in reference to light source 102. At block 2204, the light is polarized, e.g., as discussed in reference to polarizer 112. At block 2206, the polarized light is modified to produce sample light having a plurality of polarization states at each of the multiple wavelengths using a Fresnel cone, e.g., as discussed in reference to Fresnel cone 116. At block 2208, the sample light is caused to be incident on a sample, wherein the sample light interacts with and is reflected by the sample producing reflected light, e.g., as discussed in reference to optical elements 120, 122, 136 and 138. At block 2210, the wavelengths in the reflected light are separated, e.g., as discussed in reference to wavelength separator 142, as well as wavelength separators 1042, 1042', 2004, and 2008. At block 2212, the reflected light is separated into a plurality of polarization states using a polarization separator, e.g., as discussed in reference to polarization separator 144, as well as polarization separators 1044, 1644, 2002, and 2006. At block 2214, one or more images of separated wavelengths are captured at each of the plurality of polarization states of the reflected light using a two-dimensional sensor, e.g., as discussed in reference to two-dimensional sensor 146. At block 2216, at least a partial Mueller matrix is determined for the sample using the image of the spatially separated wavelengths at each of the plurality of polarization states of the reflected light, e.g., as discussed in reference to computer system 170 with at least one processor 172 that is configured with computer-readable-program code to operate as a special purpose computer.

In one implementation, separating the wavelengths in the reflected light may comprise spatially separating the wavelengths using a diffractive element, such as diffractive elements 1042, 2004, and 2008, wherein capturing one or more images comprises capturing one image of spatially separated wavelengths at each of the plurality of polarization states of the reflected light.

In one implementation, separating the wavelengths in the reflected light may comprise temporally separating the wavelengths in the reflected light, wherein capturing one or more images comprises capturing multiple images, each image having a different wavelengths at each of the plurality of polarization states of the reflected light. For example, temporally separating the wavelengths in the reflected light is performed by one of an acousto-optic tunable filter or the light source that emits each wavelength in the multiple wavelengths separately. For example, the light source may be a Fourier Domain Mode Locked Laser light source.

In one implementation, the light having multiple wavelengths comprises multiple non-contiguous bands of wavelengths, e.g., as illustrated in FIG. 11, and separating the wavelengths in the reflected light includes separating the multiple non-contiguous bands of wavelengths, e.g., as illustrated by non-contiguous beams 1043, 2005, and 2009, so that the multiple non-contiguous bands of wavelengths are non-overlapping in the one or more images received by the two-dimensional sensor. For example, generating light having multiple wavelengths may be performed by a broadband frequency comb light source.

In one implementation, the light having multiple wavelengths comprises a continuous spectrum of wavelengths, e.g., as illustrated in FIG. 19, and separating the wavelengths in the reflected light produces a spectrum of wavelengths, e.g., as illustrated by light 1843, 2105, and 2109. The method may further include filtering the spectrum of wavelengths to produce multiple non-contiguous bands of wavelengths, wherein the multiple non-contiguous bands of wavelengths are non-overlapping in the one or more images received by the two-dimensional sensor, e.g., as discussed in reference to filters 1802 and 2102. For example, the spectrum of wavelengths may be filtered after separating the reflected light into a plurality of polarization states.

In one implementation, the polarized light is modified to produce the sample light having the plurality of polarization states at each of the multiple wavelengths using the Fresnel cone includes using total internal reflections (TIR) of the Fresnel cone having an optical coating with an index of refraction selected to produce a constant phase shift for the wavelengths of light imaged by the two-dimensional sensor, e.g., as discussed in reference to optical material 212.

In one implementation, the polarization separator separates the reflected light into the plurality of polarization states so that the polarization states are non-overlapping in the one or more images received by the two-dimensional sensor, e.g., as discussed in reference to polarization separator 1044, 1644, 2002 and 2006.

In one implementation, the reflected light is separated into the plurality of polarization states using the polarization separator by producing polarization states that are vertices of a best-measurement tetrahedron within a Poincare sphere, as discussed in reference to polarization separator 1044.

In one implementation, the polarization separator that separates the reflected light into the plurality of polarization states is a grating before the two-dimensional sensor, wherein the grating is configured to diffract different polarization states into different transmission orders, e.g., as discussed in reference to meta-grating 1046. Additionally, the different polarization states in the reflected light are analyzed, e.g., as discussed in reference to meta-grating 1046, polarizer 1045 and micropolarizer array 1645. The grating may be comprised of a spaced array of phase-shifting elements, e.g., as discussed in reference to meta-grating 1046 and phase shifting elements 1302. The different polarization states in the reflected light may be analyzed by diffracting the different polarization states into different transmission orders with the grating and polarizing the different polarization states from the grating with a linear polarizer, e.g., as discussed in reference to polarizer 1045. The different polarization states in the reflected light may be analyzed by diffracting the different polarization states into different transmission orders with the grating and polarizing the different polarization states from the grating with a micropolarizer array comprising micropolarizer pixels aligned with pixels of the two-dimensional sensor, wherein the micropolarizer array comprises a repeated array of micropolarizer pixels having discrete polarizations, e.g., as discussed in reference to micropolarizer array 1645.

In one implementation, separating the wavelengths in the reflected light is performed by a first diffractive element and a second diffractive element, and the reflected light is separated into a plurality of polarization states using a polarization separator by directing a first portion of the reflected light to the first diffractive element with a beam splitter; and receiving a second portion of the reflected light from the beam splitter with a phase shifting optical element and directing the second portion of the reflected light to the second diffractive element with the phase shifting optical element, wherein the first portion of the reflected light has a different polarization state than the second portion of the reflected light, e.g., as discussed in reference to beam splitter 2002 and phase shifting optical element (Fresnel prism 2006). The wavelengths in the reflected light are separated by separating the wavelengths in the first portion of the reflected light with the first diffractive element and separating the wavelengths in the second portion of the reflected light with the second diffractive element, e.g., as discussed in reference to prisms 2004 and 2008. The different polarization states in the first portion of the reflected light and the second portion of the reflected light are analyzed with a micropolarizer array comprising micropolarizer pixels aligned with pixels of the two-dimensional sensor, wherein the micropolarizer array comprises a repeated array of micropolarizer pixels having discrete polarizations, e.g., as discussed in reference to micropolarizer array 1645. The micropolarizer array may be configured to produce two orthogonal rings around a Poincare sphere using the separated wavelengths in the reflected light from the first diffractive element and the separated wavelengths in the reflected light from the second diffractive element, e.g., as discussed in reference to micropolarizer array 1645. The intersections of the two orthogonal rings around the Poincare sphere may be used to reference a first two-dimensional sensor to the second two-dimensional sensor.

In one implementation, an ellipsometer may include a means for generating light having multiple wavelengths, which may be, e.g., light source 102, which may be emit multiple non-contiguous bands of wavelengths such as a broadband frequency comb light source or a Fourier domain mode locked laser light source, or may emit multiple contiguous wavelengths, such as thermal (halogen) bulbs or high pressure arc-discharge plasma lamps. A means for polarizing the light may be, e.g., polarizer 112. A means for modifying the polarized light to produce sample light having a plurality of polarization states at each of the multiple wavelengths may be a Fresnel cone 116. A means for causing the sample light to be incident on the sample, wherein the sample light interacts with and is reflected by the sample producing reflected light may be focusing optics, such as focusing optics 122 and 136 which may include multiple optical elements/lenses, either refractive or reflective, or a combination thereof. A means for separating the wavelengths in the reflected light may be, e.g., wavelength separators 142, 1042, 1042', 2004, 2008, or light source 102 and sensor 146. A means for separating the reflected light into a plurality of polarization states may be, e.g., polarization separator 144, 1044, 1644, 2002, and 2006. A means for capturing one or more images of separated wavelengths at each of the plurality of polarization states of the reflected light may be, e.g., two-dimensional sensor 146. A means for determining at least a partial Mueller matrix for the sample using the one or more images of the separated wavelengths at each of the plurality of polarization states of the reflected light may be, e.g., the computer system 170 with at least one processor 172 that is configured with computer-readable program code to operate as a special purpose computer using algorithms such as those disclosed herein.

In one implementation, the means for separating the wavelengths in the reflected light may spatially separate the wavelengths using a diffractive element, such as diffractive elements 1042, 2004, and 2008, wherein the means for capturing one or more images captures one image of spatially separated wavelengths at each of the plurality of polarization states of the reflected light.

In one implementation, the means for separating the wavelengths in the reflected light may temporally separate the wavelengths in the reflected light, e.g., using an acousto-optic tunable filter 1042' or the light source 102 such as a Fourier Domain Mode Locked Laser light source that emits each wavelength in the multiple wavelengths separately, wherein the means for capturing one or more images captures multiple images, each image having a different wavelengths at each of the plurality of polarization states of the reflected light.

In one implementation, the light has multiple non-contiguous bands of wavelengths, and the means for separating the wavelengths in the reflected light, which may be, e.g., a broadband frequency comb light source, separates the multiple non-contiguous bands of wavelengths so that the multiple non-contiguous bands of wavelengths are non-overlapping in the one or more images.

In one implementation, the light has a continuous spectrum of wavelengths, and the means for separating the wavelengths in the reflected light, which may be, e.g., wavelength separators 1042, 2004, 2008, produces a spectrum of wavelengths, and the ellipsometer may further include a means for filtering the spectrum of wavelengths to produce multiple non-contiguous bands of wavelengths, which may be, e.g., filters 1802 or 2102, wherein the multiple non-contiguous bands of wavelengths are non-overlapping in the one or more images. The means for filtering the spectrum of wavelengths may be positioned in the beam path after the means for separating the reflected light into a plurality of polarization states.

In one implementation, the means for modifying the polarized light to produce the sample light having the plurality of polarization states at each of the multiple wavelengths includes a means for total internal reflections (TIR) having an optical coating with an index of refraction selected to produce a constant phase shift for the wavelengths of light imaged by the two-dimensional sensor, which may be, e.g., optical material 212 on Fresnel cone 116.

In one implementation, the means for separating the reflected light into the plurality of polarization states separates the reflected light into the plurality of polarization states so that the polarization states are non-overlapping in the one or more images, which may be, e.g., polarization separator 1044, 1655, 2002, and 2006.

In one implementation, the means for separating the reflected light into the plurality of polarization states may produce polarization states that are vertices of a best-measurement tetrahedron within a Poincare sphere, which may be, e.g., polarization separator 1044.

In one implementation, the means for separating the reflected light into the plurality of polarization states may be a grating, such as meta-grating 1046, positioned in the beam path before the means for capturing the one or more images, wherein the grating is configured to diffract different polarization states into different transmission orders, and the ellipsometer may further include a means for analyzing the different polarization states in the reflected light, which may be, e.g., meta-grating 1046, polarizer 1045 and micropolarizer array 1645. The grating may be comprised of a spaced array of phase-shifting elements, e.g., as discussed in reference to meta-grating 1046 and phase shifting elements 1302. The means for analyzing the different polarization states in the reflected light may be a means for diffracting the different polarization states into different transmission orders and a means for polarizing the different polarization states, which may be, e.g., meta-grating 1046 and polarizer 1045. The means for analyzing the different polarization states in the reflected light may be a means for diffracting the different polarization states into different transmission orders and polarizing the different polarization states with micropolarizer pixels aligned with pixels of the means for capturing the one or more images, wherein the micropolarizer pixels are in a repeated array of micropolarizer pixels having discrete polarizations, which may be, e.g., the micropolarizer array 1645.

In one implementation, the means for separating the wavelengths in the reflected light may include a first diffractive element and a second diffractive element, e.g., prisms 2004 and 2008, and the means for separating the reflected light into a plurality of polarization states using the polarization separator may include a means for directing a first portion of the reflected light to the first diffractive element, which may be beam splitter 2002, and a means for receiving a second portion of the reflected light and directing the second portion of the reflected light to the second diffractive element, wherein the first portion of the reflected light has a different polarization state than the second portion of the reflected light, which may be, e.g., phase shifting optical element, such as Fresnel prism 2006. The means for separating the wavelengths in the reflected light may include the first diffractive element separating the wavelengths in the first portion of the reflected light and the second diffractive element separating the wavelengths in the second portion of the reflected light. The ellipsometer may further include a means for analyzing the polarization states in the first portion of the reflected light and the second portion of the reflected light, which may be, e.g., a micropolarizer array 1645 with micropolarizer pixels aligned with pixels of the two-dimensional sensor, wherein the micropolarizer array comprises a repeated array of micropolarizer pixels having discrete polarizations. The means for analyzing the polarization states may be configured to produce two orthogonal rings around a Poincare sphere using the separated wavelengths in the reflected light from the first diffractive element and the separated wavelengths in the reflected light from the second diffractive element. The intersections of the two orthogonal rings around the Poincare sphere are used to reference a first two-dimensional sensor to the second two-dimensional sensor.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. An ellipsometer comprising:
a light source that emits light having multiple wavelengths;
a polarization state generator comprising:
a polarizer that polarizes the light to produce polarized light;
a Fresnel cone that receives the polarized light and produces sample light having a plurality of polarization states at each of the multiple wavelengths that is directed to a sample;
a polarization state analyzer that receives reflected light produced by the sample light reflecting from the sample and produces a plurality of polarization states of the reflected light; and
a two-dimensional sensor that receives the reflected light from the polarization state analyzer in one or more images of separated wavelengths at each of the plurality of polarization states of the reflected light, the two-dimensional sensor outputs data from the one or more images.

2. The ellipsometer of claim 1, further comprising a diffractive element that spatially separates the wavelengths in the reflected light, wherein the two-dimensional sensor receives one image of spatially separated wavelengths at each of the plurality of polarization states of the reflected light.

3. The ellipsometer of claim 1, further comprising a wavelength separator that temporally separates the wavelengths in the reflected light, wherein the two-dimensional sensor receives multiple images, each image having a different wavelengths at each of the plurality of polarization states of the reflected light.

4. The ellipsometer of claim 3, wherein the wavelength separator comprises one of an acousto-optic tunable filter or the light source that emits each wavelength in the multiple wavelengths separately.

5. The ellipsometer of claim 4, wherein the light source is a Fourier Domain Mode Locked Laser light source.

6. The ellipsometer of claim 1, wherein the light having multiple wavelengths comprises multiple non-contiguous bands of wavelengths, the ellipsometer further comprising a wavelength separator that separates the multiple non-contiguous bands of wavelengths so that the multiple non-contiguous bands of wavelengths are non-overlapping in the one or more images received by the two-dimensional sensor.

7. The ellipsometer of claim 6, wherein the light source is a broadband frequency comb light source.

8. The ellipsometer of claim 1, wherein the light having multiple wavelengths comprises a continuous spectrum of wavelengths, the ellipsometer further comprising a wavelength separator that separates the wavelengths in the reflected light and a wavelength filter that is positioned to receive separated wavelengths from the wavelength separator and produces multiple non-contiguous bands of wavelengths, wherein the multiple non-contiguous bands of wavelengths are non-overlapping in the one or more images received by the two-dimensional sensor.

9. The ellipsometer of claim 8, wherein the wavelength filter is on the two-dimensional sensor.

10. The ellipsometer of claim 8, wherein the wavelength filter is between the wavelength separator and the two-dimensional sensor.

11. The ellipsometer of claim 1, wherein the Fresnel cone comprises an optical coating with an index of refraction selected to produce a constant phase shift for the wavelengths of light in the one or more images received by the two-dimensional sensor.

12. The ellipsometer of claim 1, wherein the polarization state analyzer comprises a polarization separator that separates the reflected light into the plurality of polarization states so that the polarization states are non-overlapping in the one or more images received by the two-dimensional sensor.

13. The ellipsometer of claim 1, wherein the polarization state analyzer comprises a polarization separator that separates the reflected light into the plurality of polarization states and is configured to produce polarization states that are vertices of a best-measurement tetrahedron within a Poincare sphere.

14. The ellipsometer of claim 1, wherein the polarization state analyzer comprises a grating that separates the reflected light into the plurality of polarization states, the grating is configured to diffract different polarization states into different transmission orders, and a second polarizer that analyzes the different polarization states in the reflected light.

15. The ellipsometer of claim 14, wherein the grating comprises a spaced array of phase-shifting elements.

16. The ellipsometer of claim 14, wherein the second polarizer is a linear polarizer between the grating and the two-dimensional sensor.

17. The ellipsometer of claim 14, wherein the second polarizer comprises a micropolarizer array comprising micropolarizer pixels aligned with pixels of the two-dimensional sensor, wherein the micropolarizer array comprises a repeated array of micropolarizer pixels having discrete polarizations.

18. The ellipsometer of claim 1, further comprising a first diffractive element and a second diffractive element, and further comprising:
a beam splitter that receives the reflected light and directs a first portion of the reflected light to the first diffractive element;
a phase shifting optical element that receives a second portion of the reflected light from the beam splitter and directs the second portion of the reflected light to the second diffractive element, wherein the first portion of the reflected light has a different polarization state than the second portion of the reflected light;
wherein the first diffractive element separates the wavelengths in the first portion of the reflected light and the second diffractive element separates the wavelengths in the second portion of the reflected light, and
wherein the polarization state analyzer comprises a micropolarizer array comprising micropolarizer pixels aligned with pixels of the two-dimensional sensor, wherein the micropolarizer array comprises a repeated array of micropolarizer pixels having discrete polarizations, wherein the micropolarizer array analyzes the polarization states in the first portion of the reflected light and the second portion of the reflected light.

19. The ellipsometer of claim 18, wherein the micropolarizer array is configured to produce two orthogonal rings around a Poincare sphere using separated wavelengths in the reflected light from the first diffractive element and the separated wavelengths in the reflected light from the second diffractive element.

20. The ellipsometer of claim 19, wherein intersections of the two orthogonal rings around the Poincare sphere are used to reference a first two-dimensional sensor to a second two-dimensional sensor.

21. A method of characterizing a sample with an ellipsometer, the method comprising:
generating a light having multiple wavelengths;
generating polarization states of the light with a polarization state generator comprising:
polarizing the light to create a polarized light;
modifying the polarized light to produce sample light having a plurality of polarization states at each of the multiple wavelengths using a Fresnel cone to create a modified polarized light to be incident on and reflected from the sample;
producing a plurality of polarization states of the modified polarized light reflected from the sample with a polarization state analyzer; and
detecting in one or more images of separated wavelengths at each of the plurality of polarization states of reflected light from the sample using a two-dimensional sensor, and outputting data from the one or more images.

22. The method of claim 21, further comprising spatially separating the wavelengths using a diffractive element, wherein detecting one or more images comprises detecting one image of spatially separated wavelengths at each of the plurality of polarization states of the reflected light.

23. The method of claim 21, further comprising temporally separating the wavelengths in the reflected light, wherein detecting one or more images comprises detecting multiple images, each image having a different wavelengths at each of the plurality of polarization states of the reflected light.

24. The method of claim 23, wherein temporally separating the wavelengths in the reflected light is performed by one of an acousto-optic tunable filter or a light source that emits each wavelength in the multiple wavelengths separately.

25. The method of claim 24, wherein the light source is a Fourier Domain Mode Locked Laser light source.

26. The method of claim 21, wherein the light having multiple wavelengths comprises multiple non-contiguous bands of wavelengths, further comprising separating the multiple non-contiguous bands of wavelengths so that the multiple non-contiguous bands of wavelengths are non-overlapping in the one or more images received by the two-dimensional sensor.

27. The method of claim 26, wherein generating light having multiple wavelengths comprises generating light using a broadband frequency comb light source.

28. The method of claim 21, wherein the light having multiple wavelengths comprises a continuous spectrum of wavelengths, the method further comprising separating the wavelengths in the reflected light to produce a spectrum of wavelengths; and
filtering the spectrum of wavelengths to produce multiple non-contiguous bands of wavelengths, wherein the multiple non-contiguous bands of wavelengths are non-overlapping in the one or more images received by the two-dimensional sensor.

29. The method of claim 28, wherein filtering the spectrum of wavelengths is performed after separating the reflected light into the plurality of polarization states.

30. The method of claim 21, wherein modifying the polarized light to produce the sample light having the plurality of polarization states at each of the multiple wavelengths using the Fresnel cone comprises using total internal reflections (TIR) of the Fresnel cone having an optical coating with an index of refraction selected to produce a constant phase shift for the wavelengths of light imaged by the two-dimensional sensor.

31. The method of claim 21, wherein producing the plurality of polarization states comprises separating the reflected light into the plurality of polarization states so that the polarization states are non-overlapping in the one or more images received by the two-dimensional sensor.

32. The method of claim 21, wherein producing the plurality of polarization states comprises separating the reflected light into the plurality of polarization states that are vertices of a best-measurement tetrahedron within a Poincare sphere.

33. The method of claim 21, wherein producing the plurality of polarization states comprises separating the reflected light into the plurality of polarization states using a grating before the two-dimensional sensor, the grating is configured to diffract different polarization states into different transmission orders, and analyzing the different polarization states in the reflected light using a polarizer.

34. The method of claim 33, wherein the grating comprises a spaced array of phase-shifting elements.

35. The method of claim 33, wherein analyzing the different polarization states in the reflected light comprises diffracting the different polarization states into different transmission orders with the grating and polarizing the different polarization states from the grating with a polarizer comprising a linear polarizer.

36. The method of claim 33, wherein analyzing the different polarization states in the reflected light comprises diffracting the different polarization states into different transmission orders with the grating and polarizing the different polarization states from the grating with a polarizer comprising a micropolarizer array comprising micropolarizer pixels aligned with pixels of the two-dimensional sensor, wherein the micropolarizer array comprises a repeated array of micropolarizer pixels having discrete polarizations.

37. The method of claim 21, further comprising separating the wavelengths in the reflected light with a first diffractive element and a second diffractive element, and further comprising:
directing a first portion of the reflected light to the first diffractive element with a beam splitter;
receiving a second portion of the reflected light from the beam splitter with a phase shifting optical element and directing the second portion of the reflected light to the second diffractive element with the phase shifting optical element, wherein the first portion of the reflected light has a different polarization state than the second portion of the reflected light;
wherein separating the wavelengths in the reflected light comprises separating the wavelengths in the first portion of the reflected light with the first diffractive element and separating the wavelengths in the second portion of the reflected light with the second diffractive element; and
wherein producing the plurality of polarization states comprises analyzing the polarization states in the first portion of the reflected light and the second portion of the reflected light with a micropolarizer array comprising micropolarizer pixels aligned with pixels of the two-dimensional sensor, wherein the micropolarizer array comprises a repeated array of micropolarizer pixels having discrete polarizations.

38. The method of claim 37, wherein the micropolarizer array is configured to produce two orthogonal rings around a Poincare sphere using separated wavelengths in the reflected light from the first diffractive element and the separated wavelengths in the reflected light from the second diffractive element.

39. The method of claim 38, wherein intersections of the two orthogonal rings around the Poincare sphere are used to reference a first two-dimensional sensor to a second two-dimensional sensor.

40. An ellipsometer comprising:
means for generating a light having multiple wavelengths;
a polarization state generator comprising:
  means for polarizing the light to create a polarized light;
  means for modifying the polarized light to produce sample light having a
plurality of polarization states at each of the multiple wavelengths to create a modified polarized light to be incident on and reflected from a sample;
a polarization state analyzer comprising a means for producing a plurality of polarization states of the modified polarized light reflected from the sample; and
means for detecting in one or more images of separated wavelengths at each of the plurality of polarization states of reflected light from the sample, and outputting data from the one or more images.

* * * * *